(12) United States Patent
Kai et al.

(10) Patent No.: US 11,734,940 B2
(45) Date of Patent: Aug. 22, 2023

(54) DISPLAY APPARATUS, DISPLAY METHOD, AND NON-TRANSITORY RECORDING MEDIUM

(71) Applicants: Toshihiro Kai, Tokyo (JP); Susumu Fujioka, Kanagawa (JP)

(72) Inventors: Toshihiro Kai, Tokyo (JP); Susumu Fujioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/695,832

(22) Filed: Mar. 16, 2022

(65) Prior Publication Data
US 2022/0309818 A1    Sep. 29, 2022

(30) Foreign Application Priority Data

Mar. 23, 2021 (JP) ................. 2021-049023

(51) Int. Cl.
*G06F 3/033* (2013.01)
*G06V 30/422* (2022.01)
*G06V 30/414* (2022.01)
*B43L 13/00* (2006.01)

(52) U.S. Cl.
CPC .......... *G06V 30/422* (2022.01); *G06V 30/414* (2022.01); *B43L 13/00* (2013.01)

(58) Field of Classification Search
CPC .... G06V 30/422; G06V 30/414; B43L 13/00; G06F 3/04883
USPC ........................................................ 715/863
See application file for complete search history.

(56) References Cited

U.S. PATENT DOCUMENTS

| | | | |
|---|---|---|---|
| 2009/0138830 A1* | 5/2009 | Borgaonkar | G06F 3/04883 |
| | | | 715/863 |
| 2015/0332060 A1 | 11/2015 | Tsumura et al. | |
| 2020/0382700 A1 | 12/2020 | Takatsu et al. | |
| 2021/0133363 A1 | 5/2021 | Okumura et al. | |
| 2022/0019782 A1 | 1/2022 | Oshima et al. | |

FOREIGN PATENT DOCUMENTS

| | | |
|---|---|---|
| JP | 2000-165577 | 6/2000 |
| JP | 2007-265171 | 10/2007 |

* cited by examiner

*Primary Examiner* — Abdul-Samad A Adediran
(74) *Attorney, Agent, or Firm* — Xsensus LLP

(57) ABSTRACT

A display apparatus includes circuitry to receive an input of a plurality of strokes representing a drawing that includes one or more drawing components including a first drawing component. The plurality of strokes is divided under a predetermined condition to obtain the one or more drawing components. The circuitry stores, in a memory, each of the one or more drawing components and drawing data representing the drawing. The circuitry displays, on a display screen, in response to receiving an input of a second drawing component, the drawing represented by the drawing data based on the first drawing component and the second drawing component.

10 Claims, 18 Drawing Sheets

DISPLAY APPARATUS, DISPLAY METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2021-049023, filed on Mar. 23, 2021, in the Japan Patent Office, the entire disclosure of which is hereby incorporated by reference.

BACKGROUND

Technical Field

Embodiments of the present disclosure relate to a display apparatus, a display method, and a non-transitory recording medium.

Related Art

Display apparatuses such as electronic whiteboards having a touch panel display that displays strokes input by user hand drafted inputs, namely written or drawn by a user, with an input device, such as a dedicated electronic pen, or a finger are known. A display apparatus having a relatively large touch panel is used in a conference room and is shared by a plurality of users as an electronic whiteboard, for example.

A technique for assisting a user hand drafted input is known. Apparatus that stores stroke data representing handwritten characters as stroke data, searches for the stroke data having a common feature with respect to a new input, and displays the stroke data as prospective characters to be displayed.

SUMMARY

An embodiment of the present disclosure includes a display apparatus including circuitry to receive an input of a plurality of strokes representing a drawing that includes one or more drawing components including a first drawing component. The plurality of strokes is divided under a predetermined condition to obtain the one or more drawing components. The circuitry stores, in a memory, each of the one or more drawing components and drawing data representing the drawing. The circuitry displays, on a display screen, in response to receiving an input of a second drawing component, the drawing represented by the drawing data based on the first drawing component and the second drawing component.

An embodiment of the present disclosure includes a display method including receiving an input of a plurality of strokes representing a drawing that includes one or more drawing components including a first drawing component. The plurality of strokes is divided under a predetermined condition to obtain the one or more drawing components. The display method includes storing, in a memory, each of the one or more drawing components and drawing data representing the drawing. The display method including displaying, on a display screen, in response to receiving an input of a second drawing component, the drawing represented by the drawing data based on the first drawing component and the second drawing component.

An embodiment of the present disclosure includes a non-transitory recording medium storing a plurality of instructions which, when executed by one or more processors, causes the processors to perform a method. The method includes receiving an input of a plurality of strokes representing a drawing that includes one or more drawing components including a first drawing component. The plurality of strokes is divided under a predetermined condition to obtain the one or more drawing components. The method includes storing, in a memory, each of the one or more drawing components and drawing data representing the drawing. The method including displaying, on a display screen, in response to receiving an input of a second drawing component, the drawing represented by the drawing data based on the first drawing component and the second drawing component.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
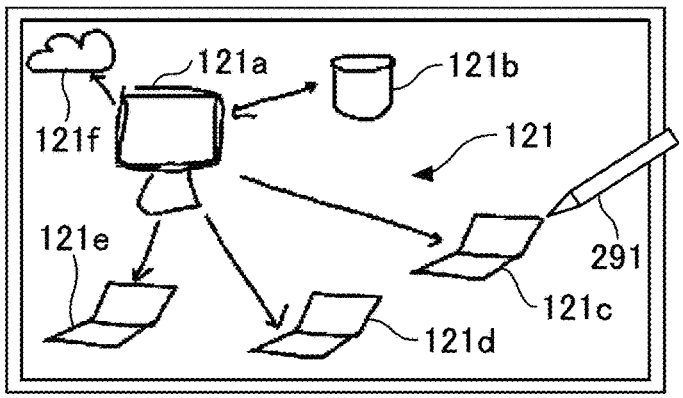
FIG. 1A to FIG. 1D are diagrams illustrating a flow in which a display apparatus a drawing, which is a whole drawing, previously drawn by user hand drafted inputs, according to a first embodiment of the disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is given below of a display apparatus and a display method performed by the display apparatus according to embodiments of the present disclosure, with reference to the attached drawings.

First Embodiment

Related Art:

First, a description is given of a related art to be compared before describing the display apparatus according to the present embodiment. A user of a display apparatus according to a related art draws a picture or a drawing each time when the user uses the same picture or the same drawing, even when the picture or the drawing is frequently used by the user. For example, a method in which a user stores a picture or a drawing that is frequently used and then selects the picture or the drawing from a list stored by the user so as to use the same picture or the drawing again is known. However, in such a known method, one or more operations up to selection and an operation of storing a picture or a drawing in advance are burdensome.

Overview of Display Apparatus of Embodiments:

In view of the related art described above, a display apparatus according to a first embodiment displays a picture or a drawing that is a whole picture or a whole drawing stored in advance, when receiving a user operation of drawing an item that is similar to a part of the picture or the drawing that is previously drawn by a user. This allows the user to display the picture or the drawing by selecting the picture or the drawing, which is previously drawn in, for example, a conference held before. This also omits user operations such as saving the picture or the drawings in advance or opening from a menu a file of list of pictures or drawings saved in the past.

Note that a picture or a drawing used in the description of the embodiment is any hand drawn picture including any form, shape, graphic, or figure, for example, and the picture or the drawing is represented by hand drafted data. In the following description of the embodiment, a term of drawing is used, but the term of drawing is replaceable with a term of picture. Because the drawing is drawn by hand, in other words input by a user hand drafted input, a wide variety of drawings is possible as examples. Further, the drawing includes a plurality of parts that is referred to as a plurality of drawing components. The plurality of drawing components is obtained by dividing the drawing with predetermined conditions, and each of the plurality of drawing components is represented by hand drafted data. Some drawing components may have forms, shapes, or figures, each of which is recognizable as having meanings, or other drawing parts may have forms, shapes, or figures, each of which is not recognizable as having meanings. In the following description of the embodiments, a drawing part may be referred to as a drawing component. In other words, "drawing component" is replaceable with "drawing part."

FIG. 1A to FIG. 1D are diagrams illustrating a flow in which a display apparatus according to the present embodiment displays a drawing, which is a whole drawing, previously drawn by user hand drafted inputs, again. FIG. 1A is a diagram illustrating a drawing 121, which is a whole drawing, drawn by a user hand drafted input in a meeting that is the first meeting. When saving the drawing 121, the display apparatus also saves drawing components 121a to 121e included in the drawing 121.

Figure 1B:
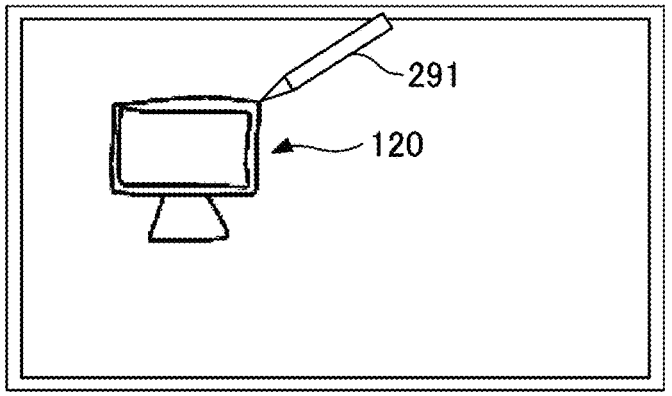

As illustrated in FIG. 1B, in the second meeting, the user has started to draw a picture corresponding to a drawing component 120. The drawing component 120 corresponds to a part of the drawing 121 that is previously drawn in the first meeting. The drawing component 120 has a shape of a personal computer (PC).

Figure 1C:
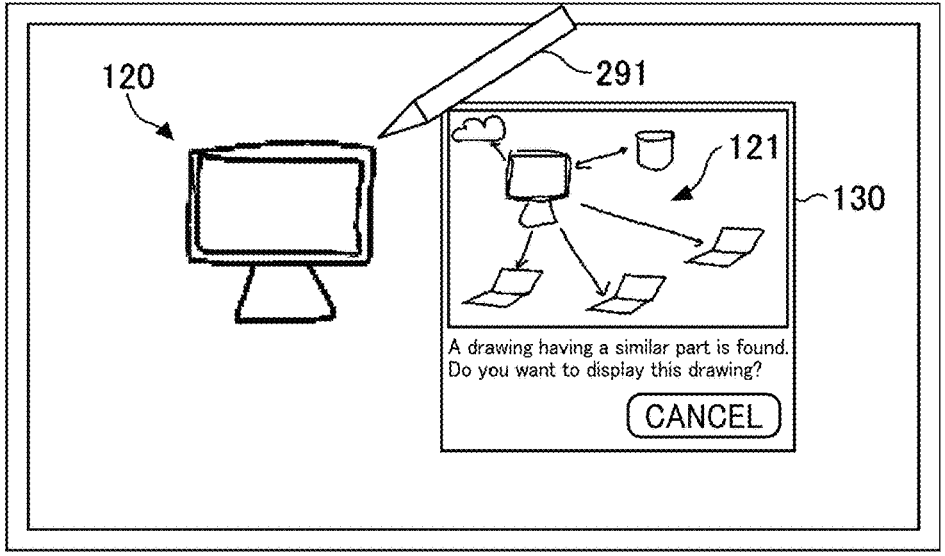

The display apparatus compares the drawing component 120 of FIG. 1B with each of the drawing components 121a to 121e stored in the first meeting to search for the corresponding drawing component. The drawing component 120 is determined to be similar to the drawing component 121a. The display apparatus displays, as a prospective drawing, the drawing 121 including the drawing component 121a, which is drawn in the first meeting, similar to the drawing component 120, which is drawn by a user hand drafted input in the second meeting (FIG. 1C). Whether to display the drawing 121 input by a user hand drafted input in the first meeting is determined according to a user operation of selection.

Figure 1D:
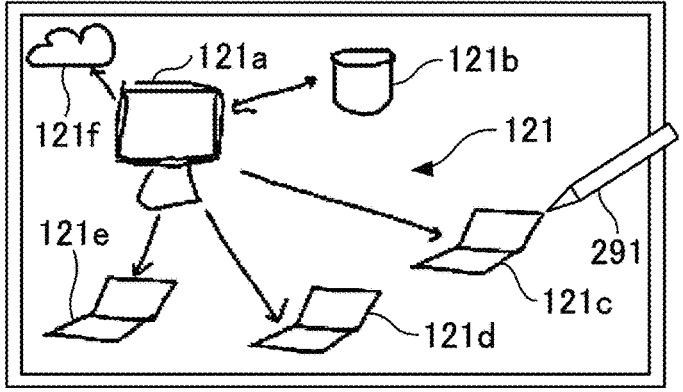

When receiving a user operation indicating to display the drawing, which is drawn by the user hand drafted input in the first meeting, the display apparatus deletes the drawing component 120 that is drawn halfway through and displays the drawing 121 (FIG. 1D).

As described above, the display apparatus according to the present embodiment stores the drawing, which is namely an overall view, and each drawing component included in the drawing. After that, when receiving a user hand drafted input of drawing a drawing component, the display apparatus compares the drawing component with the stored drawing components, and if there is a drawing component having a high degree of similarity (similarity degree) in the stored drawing components, displays the drawing, which is a whole drawing, including the drawing component having the high degree of similarity (similarity degree). This allows the user to use the drawing that is drawn in the past by drawing a part of the drawing to call up the drawing.

Terms:

"Input device" may be any devices with each of which a user hand drafted input is performable by designating coordinates on a touch panel. Examples thereof include a pen, a human finger, a human hand, and a bar-shaped member.

In the present disclosure, "hand drafted input" relates to a user input such as handwriting, drawing and other forms of input. The hand drafted input may be performed via touch interface, with a tactile object such as a pen or stylus or with the user's body. The hand drafted input may also be performed via other types of input, such as gesture-based input, hand motion tracking input or other touch-free input by a user. The following discussion will refer to handwriting input and handwriting input data, but other forms of hand drafted input may be utilized and are within the scope of the present disclosure.

A series of user operations including engaging a writing/drawing mode, recording movement of an input device or portion of a user, and then disengaging the writing/drawing mode is referred to as a stroke. The engaging of the writing/drawing mode may include, if desired, pressing an input device against a display or screen, and disengaging the writing mode may include releasing the input device from the display or screen. Alternatively, a stroke includes tracking movement of the portion of the user without contacting a display or screen. In this case, the writing/drawing mode may be engaged or turned on by a gesture of a user, pressing a button by a hand or a foot of the user, or otherwise turning on the writing/drawing mode, for example using a pointing device such as a mouse. The disengaging of the writing/drawing mode can be accomplished by the same or different gesture used to engage the writing/drawing mode, releasing the button, or otherwise turning of the writing/drawing mode, for example using the pointing device or mouse. "Stroke data" represents information that is displayed on the display based on a trajectory of coordinates input with the input device. The stroke data may be interpolated appropriately. "Hand drafted data" is data having one or more stroke data, namely including stroke data corresponding to one or more strokes. The hand drafted data includes handwritten data. "(User) hand drafted input" represents input of hand drafted data by a user. The user hand drafted input includes handwriting input.

An "object" refers to an item displayed on a screen. The term "object" in this specification represents an object of display. Examples of "object" include objects displayed based on stroke data, objects obtained by handwriting recognition from stroke data, graphics, images, characters, and the like.

A character string is one or more character codes (fonts) converted from handwritten data by character recognition. The character string may be one or more characters handled by a computer. The characters include numbers, alphabets, and symbols, for example. The character string is also referred to as text data.

The drawing data refers to the hand drafted data of all user hand drafted inputs representing a whole drawing drawn and displayed on a screen. It does not matter whether the drawing is meaningful or not as a diagram. A screen refers to entire display or a defined display range. A screen may be referred to as a page. In the description of embodiments, the drawing data is data representing a drawing that is a whole drawing including a plurality of drawing parts, or a plurality of drawing components.

The drawing component includes one or more strokes represented by stroke data. A plurality of strokes is divided into one or more groups each of which is corresponding to a single drawing component under a predetermined condition. The predetermined condition is, for example, a case where an input of a next stroke data is received at a position separated from the last input stroke data by a predetermined distance or more, or a case where an input of a next stroke data is not received within a predetermined time from a time the last input stroke data is received. The predetermined distance or the predetermined time may be set by a user or a designer, for example.

Figure 2:
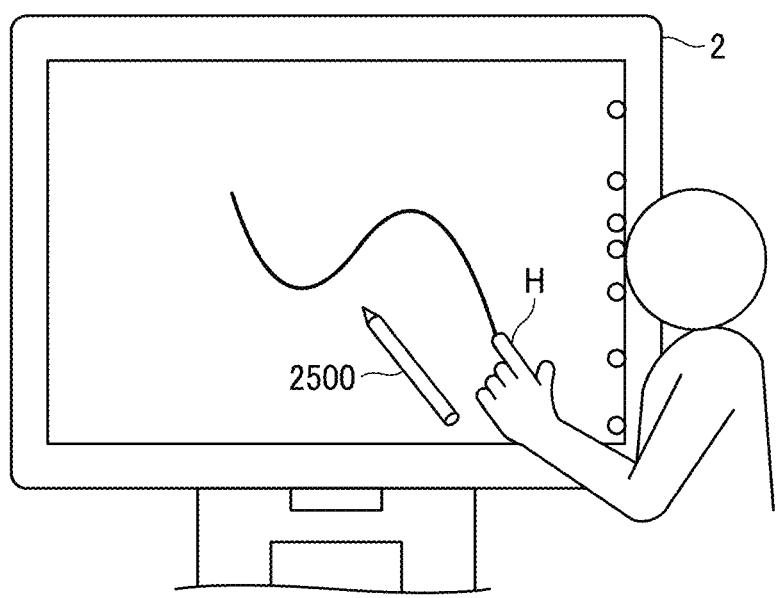
FIG. 2 is a schematic perspective view illustrating an example structure of the display apparatus according to the first embodiment of the disclosure.

Configuration:

FIG. 2 is a schematic perspective view illustrating an example structure of a display apparatus 2, according to the present embodiment. A user uses the display apparatus 2.

With the display apparatus 2 according to the present embodiment, the user can write or draw on a display 220, in other words, perform hand drafted input with an input device 291 such as a hand H or an electronic pen 2500.

Although the display apparatus 2 illustrated in FIG. 2 is placed landscape, the display apparatus 2 may be placed portrait. The user can rotate the display apparatus 2 around the center of the display 220 as an axis for switching between the landscape placement and the portrait placement.

Figure 3:
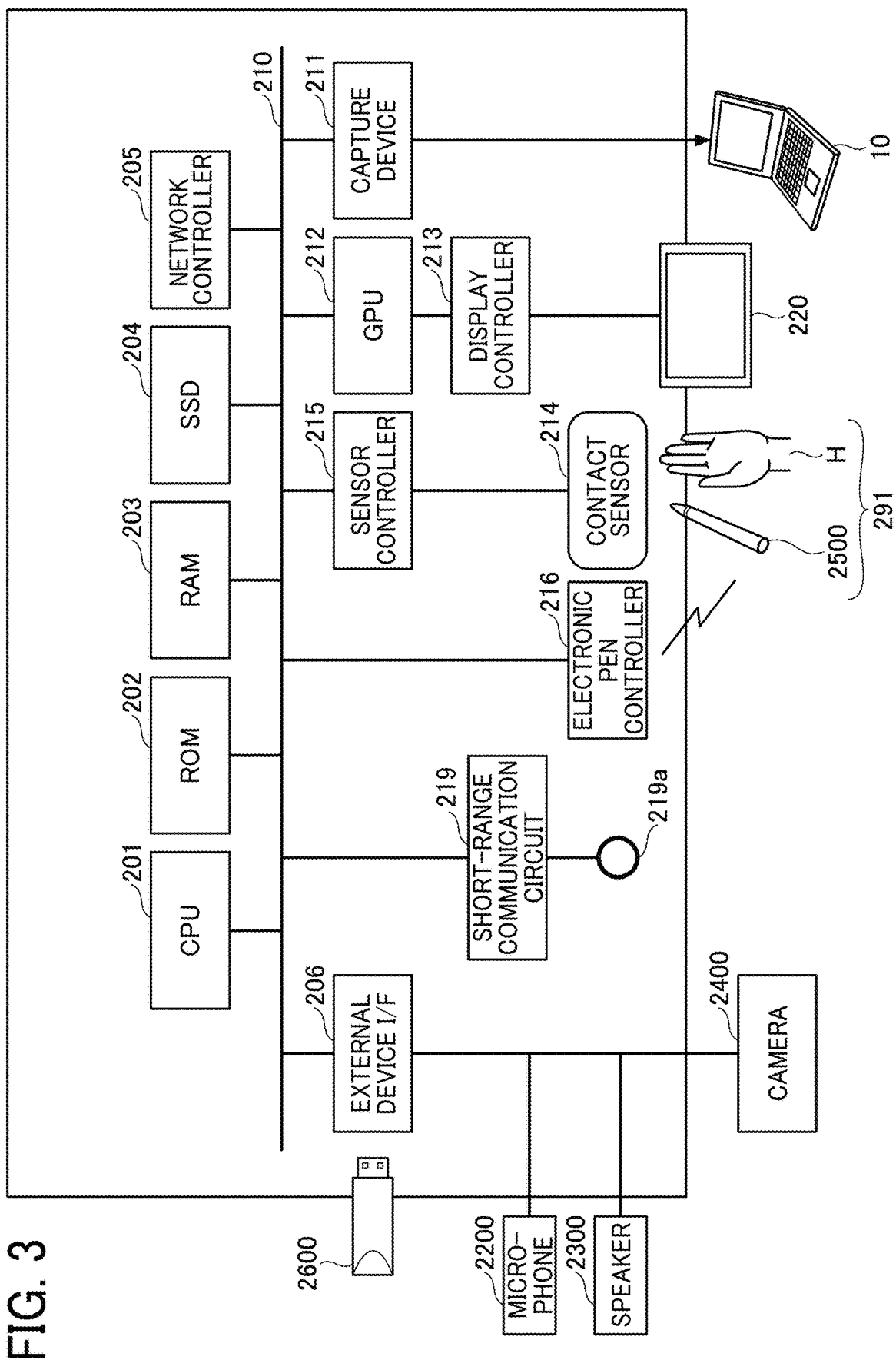
FIG. 3 is a block diagram illustrating an example of a hardware configuration of the display apparatus according to the first embodiment of the disclosure.

Hardware Configuration:

FIG. 3 is a block diagram illustrating an example of a hardware configuration of the display apparatus 2 according to the present embodiment. The display apparatus 2 includes a central processing unit (CPU) 201, a read only memory (ROM) 202, a random-access memory (RAM) 203, a solid-state drive (SSD) 204, a network controller (I/F) 205, and an external device connection I/F 206. The display apparatus 2 is a shared terminal with which information is shared with other users.

The CPU 201 controls entire operation of the display apparatus 2. The ROM 202 stores a control program such as an initial program loader (IPL) to boot the CPU 201. The RAM 203 is used as a work area for the CPU 201.

The SSD 204 stores various data such as a control program for the display apparatus 2. This program may be an application program that runs on an information processing apparatus equipped with a general-purpose operating system (OS) such as WINDOWS, MAC OS, ANDROID, and IOS.

The network controller 205 controls communication with another device through a network. The external device connection I/F 206 controls communication with a universal serial bus (USB) memory 2600 and other external devices including a camera 2400, a speaker 2300, and a microphone 2200, for example.

The display apparatus 2 further includes a capture device 211, a graphics processing unit (GPU) 212, a display controller 213, a contact sensor 214, a sensor controller 215, an electronic pen controller 216, the short-range communication circuit 219, and an antenna 219a for the short-range communication circuit 219.

The capture device 211 causes a display of a personal computer (PC) 10 to display a still image or a motion video based on image data captured by the capture device 211. The GPU 212 is a semiconductor chip dedicated to graphics. The display controller 213 controls display of an image processed by the GPU 212 for output through a display 220, for example.

The contact sensor 214 detects a touch made onto the display 220 with the electronic pen 2500 or a user's hand H. The electronic pen 2500 and the hand H are collectively referred to as input devices 291 when not distinguished from each other.

The sensor controller 215 controls operation of the contact sensor 214. The contact sensor 214 inputs and senses a coordinate by using an infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame.

The contact sensor 214 outputs an identifier (ID) of the infrared ray that is blocked by an object after being emitted from the light receiving elements, to the sensor controller 215. Based on the ID of the infrared ray, the sensor controller 215 detects a specific coordinate that is touched by the object. The electronic pen controller 216 communicates with the electronic pen 2500 by BLUETOOTH (registered trademark) to detect a touch by using the tip or bottom of the electronic pen 2500 to the display 220. The short-range communication circuit 219 is a communication circuit in compliance with a near field communication (NFC) or a BLUETOOTH, for example.

The display apparatus 2 further includes a bus line 210. Examples of the bus line 210 include an address bus and a data bus, which electrically connect the components including the CPU 201, one another.

The system of the contact sensor 214 is not limited to the infrared blocking system. Examples of the system employed by the contact sensor 214 include types of detector such as a capacitance touch panel that identifies the contact position by detecting a change in capacitance, a resistance film touch panel that identifies the contact position by detecting a change in voltage of two opposed resistance films, and an electromagnetic induction touch panel that identifies the contact position by detecting electromagnetic induction caused by contact of an object to the display. In addition to or alternative to detecting a touch by the tip or bottom of the electronic pen 2500, the electronic pen controller 216 may also detect a touch by another part of the electronic pen 25(X), such as a part held by a hand of the user.

Figure 4:
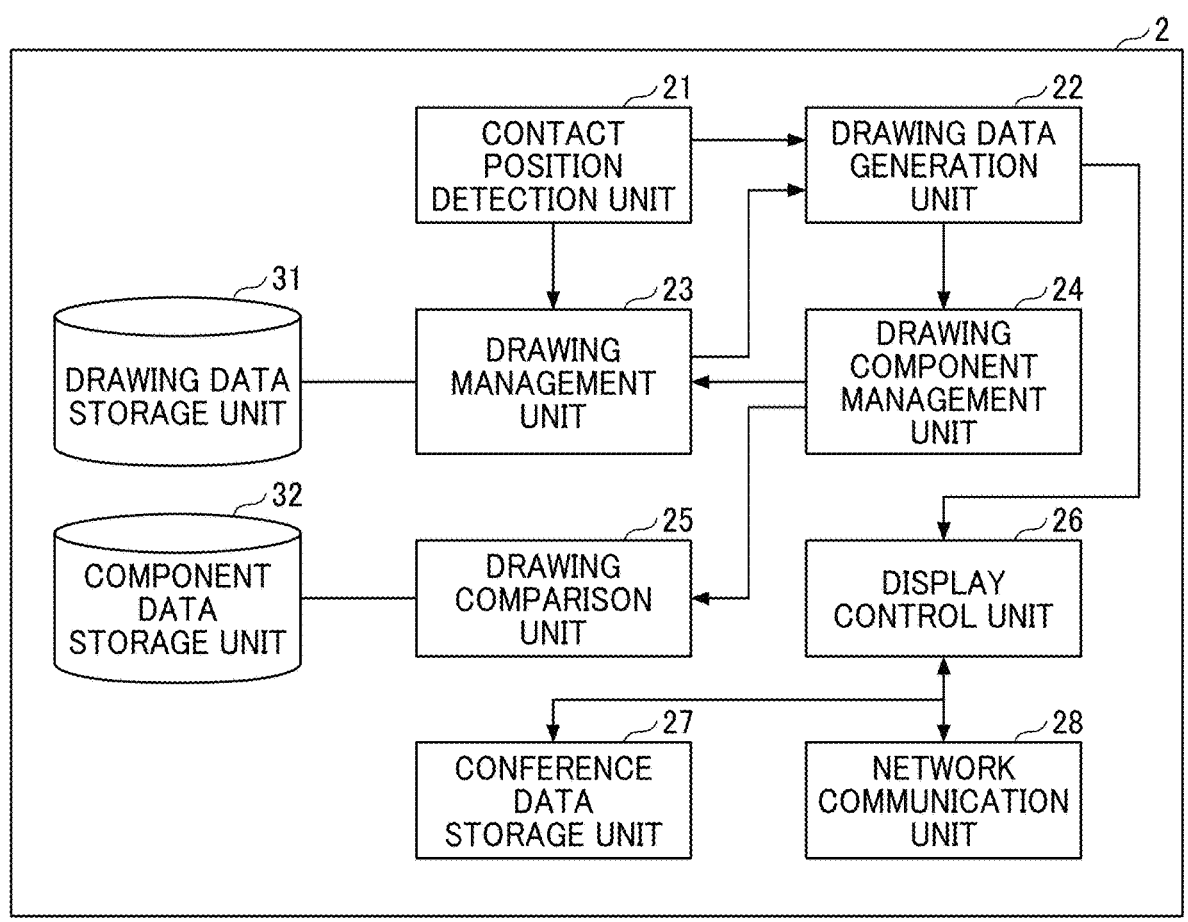
FIG. 4 is a block diagram illustrating an example of a functional configuration of the display apparatus according to the first embodiment of the disclosure.

Functions:

FIG. 4 is a block diagram illustrating an example of a functional configuration of the display apparatus 2 according to the present embodiment. The functional units of the display apparatus 2 illustrated in FIG. 4 are implemented by or are caused to function by operation of any of the elements illustrated in FIG. 4 according to an instruction from the CPU 201 according to a program loaded from the SSD 204 to the RAM 203.

The display apparatus 2 includes a contact position detection unit 21, a drawing data generation unit 22, a drawing management unit 23, a drawing component management unit 24, a drawing comparison unit 25, a display control unit 26, a conference data storage unit 27, and a network communication unit 28.

The contact position detection unit 21 detects coordinates of point of a position where the input device 291 is in contact with the contact sensor 214, and receives a user hand drafted input. The user hand drafted input correspond to a locus of coordinates at which the input device 291 is in contact with the contact sensor 214. The contact position detection unit 21 may obtain discrete values as a coordinate point sequence. The coordinates between the discrete values are interpolated.

The drawing data generation unit 22 generates a stroke data from the coordinate point sequence detected by the contact position detection unit 21. The drawing data generation unit 22 generates objects such as a circle, a rectangle, a balloon, and an arrow from the coordinate point sequence obtained by the contact position detection unit 21. For example, the user draws a shape such as a circle, a rectangle, a balloon, or an arrow using the input device 291, and the display apparatus 2 receives the corresponding hand drafted data, accordingly. The drawing data generation unit 22 generates an object similar to the drawn shape represented by the hand drafted data received.

The drawing management unit 23 stores, as a file, data representing a drawing input by a user hand drafted input in a drawing data storage unit 31 and reads the drawing stored in the drawing data storage unit 31. The drawing management unit 23 manages correspondence between a drawing and a plurality of drawing components included in the drawing.

The drawing component management unit 24 stores a drawing component in a component data storage unit 32 and reads the stored drawing component from the component data storage unit 32.

The drawing comparison unit 25 compares hand drafted data input by a user hand drafted input with a drawing component (if the hand drafted data has similarity to one of the stored drawing components, the one of the stored drawing components is the drawing component), to determine whether there is a drawing component having similarity to the hand drafted data.

The display control unit 26 performs control for displaying, for example, objects represented by hand drafted data, character strings, figures, images, or buttons or icons for operations on the display 220. The conference data storage unit 27 stores, for example, materials or files that are used in a conference in a storage medium such as the SSD 204.

The network communication unit 28 connects the network controller 205 to a network such as a local area network (LAN) or the Internet, and transmits and receives data to and from other devices via the network.

Figure 5:
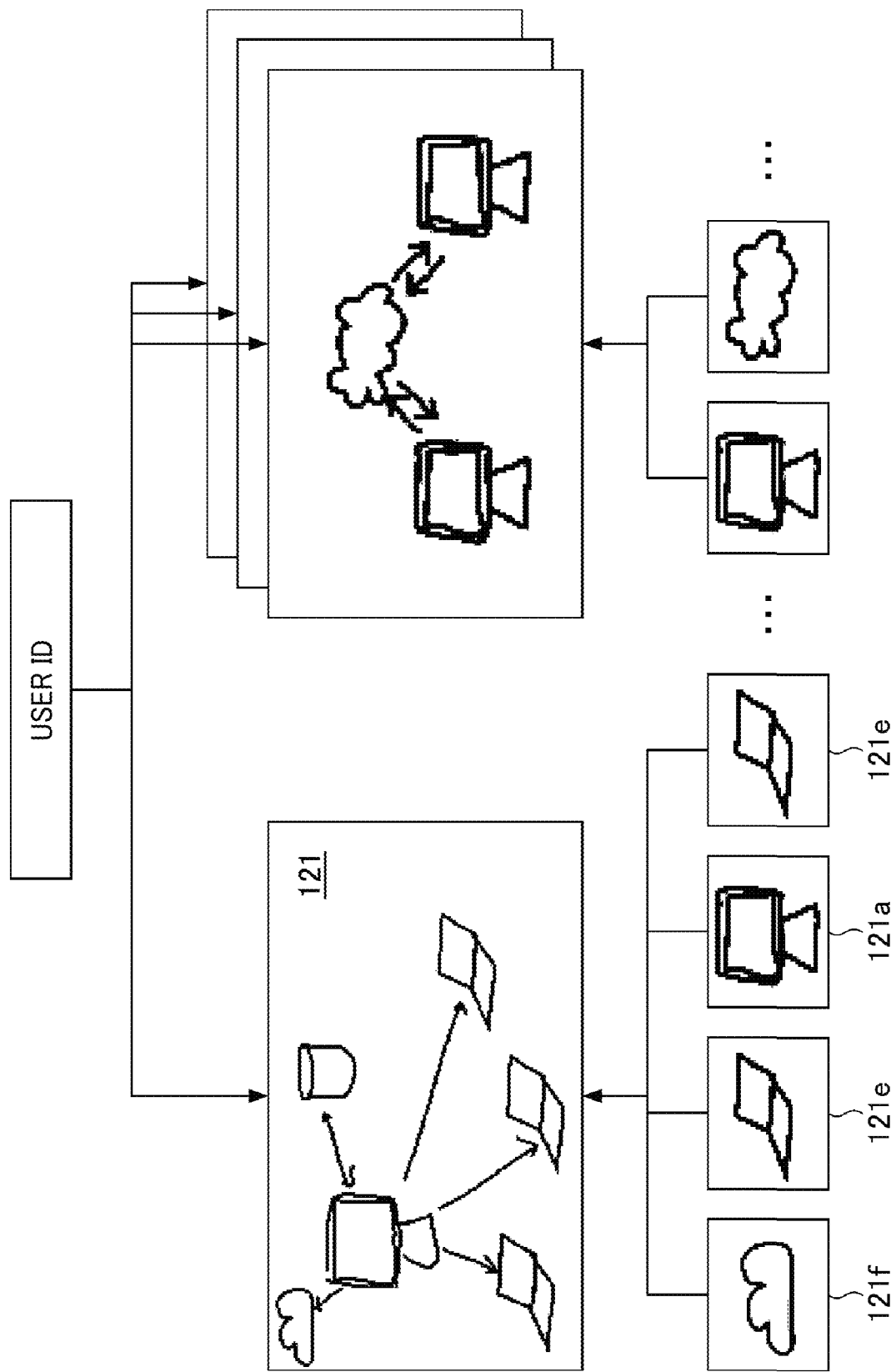
FIG. 5 is a diagram illustrating an example of correspondence between a drawing, which is a whole drawing, and drawing components, which are parts of the whole drawing, according to the first embodiment of the disclosure.

Drawing and Drawing Components:

FIG. 5 is a diagram illustrating an example of correspondence between a drawing, which is a whole drawing, and drawing components, which are parts of the whole drawing. The drawing management unit 23 stores the drawing in the drawing data storage unit 31 at the end of a conference. The drawing component management unit 24 divides the drawing into a plurality of drawing components under a prescribed condition before the end of the conference and stores the plurality of drawing components in the component data storage unit 32. The drawing component management unit 24 may store the plurality of drawing components at the end of the conference.

As illustrated in FIG. 5, the drawing created by a user (drawing creator) is stored in association with identification information (ID) of the user. In addition, the plurality of drawing components included in the drawing are stored in association with the drawing.

In the example of FIG. 5, the drawing is associated with the ID of the user (drawing creator), but whether to associate a user with a drawing may be optional according to a user operation.

Various methods of dividing a drawing into a plurality of drawing components are conceivable. As an example, a method of dividing a drawing into a plurality of drawing components by using at least one of time and space in relation to plural strokes each of which is represented by stroke data input may be used.

Figure 6:
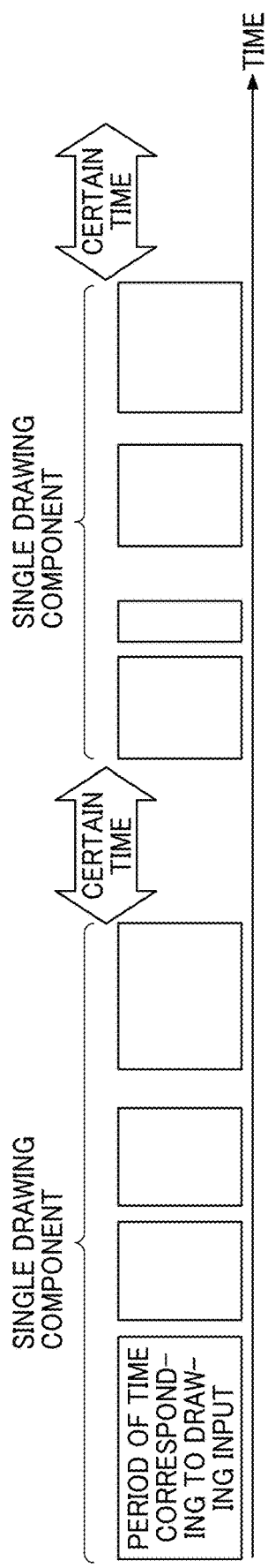
FIG. 6 is a diagram for describing an example of a method of dividing a drawing, which is a whole drawing, into a plurality of drawing components, according to the first embodiment of the disclosure.

FIG. 6 is a diagram for describing an example of a method of dividing a drawing into a plurality of drawing components. The drawing component management unit 24 stores, as a single drawing component, a plurality of stroke data items each of which representing a stroke. More specifically, each of the plurality of stroke data items is input with the input device 291, such as the electronic pen 2500 by having contact with the display 220, and the plurality of stroke data items is stored as a single drawing component when a period of time from a time when the input device 291 is separated from the display 220 has exceeds a certain time. Alternatively, when a distance between two stroke data items is equal to or greater than a predetermined value, the drawing component management unit 24 may determine that each of the two stroke data items is assigned to a corresponding one of different drawing components.

Since hand drafted data representing such as a character or an arrow may be included in any drawing, if such the hand drafted data is saved as a drawing component, an unintended drawing may be displayed each time the user draws such a character or an arrow. To cope with this, the drawing component management unit 24 preferably does not store a character or an arrow as a drawing component in a case where a character or an arrow is recognized by image recognition.

Details of Drawing Component:

A detailed description is given below of a drawing component with reference to FIG. 7A and FIG. 7B. The positions of pixels on the display 220 are expressed by display coordinates in which the origin is a pixel position at an upper left corner of a display area of the display 220, the rightward direction is a positive direction of an X axis, and a downward direction is a positive direction of a Y axis. In other words, the display coordinates are the number of pixels in the X-axis direction from the pixel at the origin position, the number of pixels in the Y-axis direction from the pixel at the origin position).

Processing of storing stroke data of a drawing component representing an electronic whiteboard drawn by a user on the display 220 of the display apparatus 2 is described below. For example, the user draws a drawing component 101 representing the electronic whiteboard on the display 220 of the display apparatus 2 in a conference. FIG. 7A is a diagram illustrating an example of the drawing component of which stroke directions and stroke orders are indicated. A stroke 2-1 and a stroke 2-2 are indicated that the input device 291 has moved while being in contact with the display 220.

The drawing component management unit 24 stores start point coordinates and end point coordinates of a stroke and calculates a distance between a stroke and another stroke. A value of a distance corresponds to a length of a line having the minimum distance between two strokes (between two stroke data items).

When the distance is equal to or less than a predetermined value (predetermined distance value) and an angle formed by directions of the two strokes is equal to or greater than a predetermined value (predetermined angle value), the drawing component management unit 24 sets the midpoint between the two strokes (the midpoint of the line having the minimum distance) as a corner and stores the coordinates of the corner in the component data storage unit 32. The angle being equal to or greater than the predetermined value may be a value at which an angle is detected instead of a straight line, and is, for example, 10 degree to 20 degree or more. In other words, a position or a part where two strokes form an angle is defined as a corner.

Figure 7B:
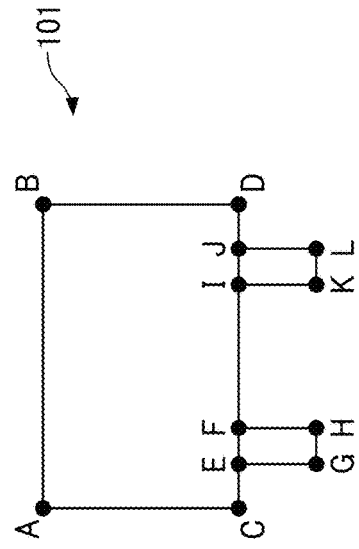
FIG. 7B is a diagram illustrating the drawing component of FIG. 7A of which detected corners are indicated, according to the first embodiment of the disclosure.

For a corner formed by a single stroke drawing, a coordinate point at which a stroke direction changes is assumed to be a corner, such as a corner B illustrated in FIG. 7B. Then, an angle formed by a stroke up to the corner and a stroke after the corner (an angle formed by directions of stroke data before and after a point where the direction of the stroke data is changed) is calculated, and when the angle is equal to or greater than a threshold value, the point at which the direction changes is defined as a corner.

Figure 7A:
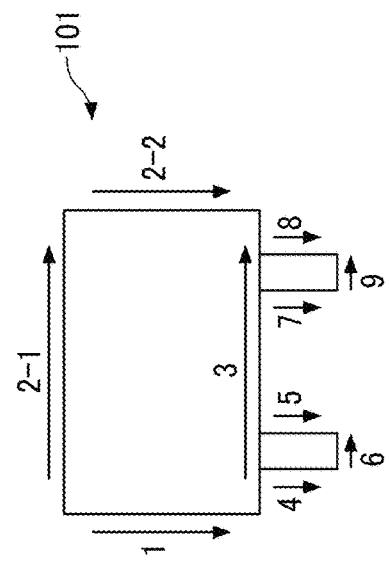
FIG. 7A is a diagram illustrating an example of a drawing component representing an electronic whiteboard drawn by a user hand drafted input, and of which stroke directions and stroke orders are indicated, according to the first embodiment of the disclosure.

FIG. 7B is a diagram illustrating the drawing component 101 of which corners A to L detected from the drawing component 101 of FIG. 7A are indicated. The corners A to L are stored as corner coordinate data in form of a table (array) as illustrated in Table 1. The corner coordinate data is recorded with coordinates of each corner.

In addition, the drawing component management unit 24 obtains distances between adjacent corners and stores the obtained distances as inter-corner distance data in a form of a table (array) as illustrated in Table 2. The inter-corner distance data records with a distance between two corners.

TABLE 1

Corner Coordinate Data

| CORNER | COORDINATES |
|---|---|
| A | (x1, y1) |
| B | (x2, y2) |
| C | (x3, y3) |
| D | (x4, y4) |
| ... | ... |
| L | (x12, y12) |

TABLE 2

Inter-Corner Distance Data

| CORNERS | INTER-CORNER DISTANCE |
|---|---|
| A, B | d1 |
| A, C | d2 |
| B, D | d3 |
| C, D | d4 |
| C, E | d5 |
| E, F | d6 |
| F, I | d7 |
| I, J | d8 |
| E, G | d9 |
| F, H | d10 |
| I, K | d11 |
| J, L | d12 |
| G, H | d13 |
| K, L | d14 |

A pair of corners in Table 2 is extracted according to a priority rule described below. The drawing component management unit 24 preferentially extracts a pair constituting an end point of a stroke among pairs constituting a horizontal line or a perpendicular line.

A difference between values of Y coordinates is within a predetermined range and is a start point or an end point of a stroke;

The pairs are (A, B), (C, D), (C, E), (E, F), (F, I), (I, J), (G, H), and (K, L).

A difference between values of X coordinates is within a predetermined range and is a start point or an end point of a stroke;

The pairs are (A, C), (B, D), (E, G), (F, H), (I, K), and (J, L).

Then, the drawing component management unit 24 arranges data on the corners in a manner that the values of the Y coordinates of the corners are in ascending order (small to large). In a case that the difference between the values of the Y coordinates of the corners is within a predetermined range, the drawing component management unit 24 arranges data on the corners in a manner that the values of the X coordinates of the corners are in ascending order (small to large). In other words, the drawing component management unit 24 arranges the data on the corners in a direction from upper left to lower right. In Table 2, the pairs of corners are registered in order arranged in the manner described above.

In a case where a difference between Y-coordinate values of three or more corners is within a predetermined range, a pair having the largest distance between the corners is given the highest priority. The pairs of corners in Table 2 are arranged according to the rule described above.

Figure 8A:
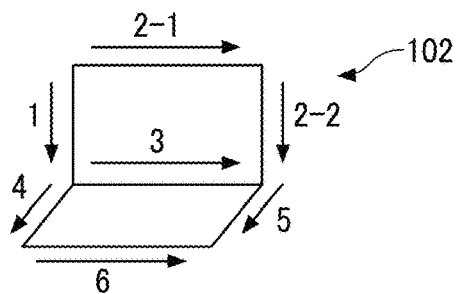
FIG. 8A is a diagram illustrating an example of a drawing component representing a notebook personal computer (PC) drawn by a user hand drafted input, and of which stroke directions and stroke orders are indicated, according to the first embodiment of the disclosure.
Figure 8B:
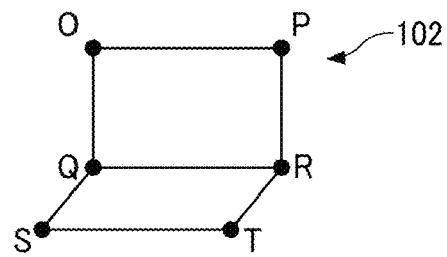
FIG. 8B is a diagram illustrating the drawing component of FIG. 8A of which detected corners are indicated, according to the first embodiment of the disclosure.

FIG. 8A and FIG. 8B are diagrams each illustrating an example of a drawing component 102 representing a laptop PC drawn by a user hand drafted input. The drawing component 102, which represents the laptop PC, is drawn on the display of the display apparatus 2 by a user hand drafted input. FIG. 8A is a diagram illustrating the drawing component 102 of which stroke directions and stroke orders are indicated. A stroke 2-1 and a stroke 2-2 are indicated that the input device 291 has moved while being in contact with the display 220.

The drawing component management unit 24 stores start point coordinates and end point coordinates of a stroke, and calculates a distance between the start point coordinates or the end point coordinates of the stroke and start point coordinates or end point coordinates of another stroke. When the distance is equal to or less than a predetermined value and an angle formed by directions of the two strokes is equal to or greater than a predetermined value, the drawing component management unit 24 detects the midpoint between the two strokes of which the distance is equal to or less than the predetermined value as a corner. The drawing component management unit 24 stores the coordinates of the corner in the component data storage unit 32.

FIG. 8B is a diagram illustrating the drawing component 102 of which corners O to T detected from the drawing component 102 of FIG. 8A are indicated. The corners O to T are stored as corner coordinate data in form of a table (array) as illustrated in Table 3.

In addition, the drawing component management unit 24 obtains distances between adjacent corners and stores the obtained distances as inter-corner distance data as illustrated in Table 4. The method of obtaining Table 4 is substantially similar to Table 2.

TABLE 3

Corner Coordinate Data

| CORNER | COORDINATES |
|---|---|
| O | (x21, y21) |
| P | (x22, y22) |
| Q | (x23, y23) |
| R | (x24, y24) |
| S | (x25, y25) |
| T | (x26, y26) |

TABLE 4

Inter-Corner Distance Data

| CORNERS | INTER-CORNER DISTANCE |
|---|---|
| O, P | d21 |
| O, Q | d22 |
| P, R | d23 |
| Q, R | d24 |
| Q, S | d25 |
| R, T | d26 |
| S, T | d27 |

Figure 9A:
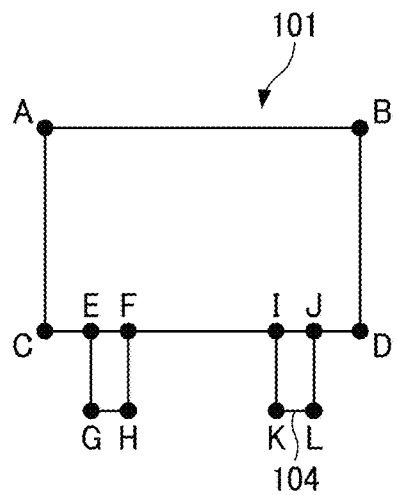
FIG. 9A and FIG. 9B are diagrams illustrating a drawing component representing an electronic whiteboard and a drawing component representing a laptop PC, respectively, according to the first embodiment of the disclosure.
Figure 9B:
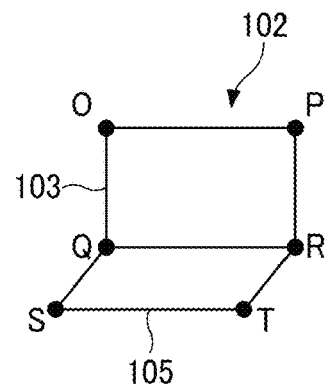

As illustrated in FIG. 9A and FIG. 9B, for example, the drawing component 102 (FIG. 9B) that is also illustrated in FIG. 8A or FIG. 8B and representing a laptop PC is drawn, by a user hand drafted input, next to the drawing component 101, which represents an electronic whiteboard and also illustrated in FIGS. 7A and 7B. In FIG. 9A and FIG. 9B, the drawing component 101, which represents an electronic whiteboard and the drawing component 102, which is represent a laptop PC, are drawn by hand drafted inputs, on one display. Each of the points A to L and each of the points O to T indicates a corner.

When a stroke 103 that is a first stroke (point O is a start point and point Q is an end point) is input, by a user hand drafted input, in order to draw the drawing component 102, which represents a laptop PC, the drawing component management unit 24 obtains a distance between the start point (point O) of the stroke 103 and a corner (point B) that is the closest to the point O among the corners of the drawing component 101, which represents an electronic whiteboard, previously drawn. The drawing component management unit 24 also obtains a distance between the end point (point Q) of the stroke 103 and a corner (point D) that is the closest to the point Q among the corners of the drawing component 101, which represents an electronic whiteboard, previously drawn. When each of the distances are equal to or greater than a predetermined value (in other words, when the distance between the stroke data of the drawing component 101 and the stroke data of the drawing component 102 is equal to or greater than a predetermined value), the drawing component management unit 24 determines that the drawing component 101, which represents an electronic whiteboard, and the drawing component 102, which represents a laptop PC, are different drawing components. In other words, the drawing component management unit 24 detects each of the drawing component 101 and the drawing component 102 as a single drawing component based on data on a plurality of strokes, or plurality of stroke data items.

The drawing component management unit 24 stores the stroke data (drawing attribute data such as a coordinate point sequence, a line thickness, and a color input by the contact position detection unit 21) of the drawing component 101, which represents an electronic whiteboard, as a file in the component data storage unit 32. A file name of the file is, for example, "fig_parts_1.data." The drawing component management unit 24 also assigns a drawing component ID=1 to the drawing component 101, which represents an electronic whiteboard.

The drawing component management unit 24 generates a drawing component management table in which the drawing component ID, the corner coordinate data indicated in Table 1, the inter-corner distance data indicated in Table 2, and the stroke data file ("fig_parts_1.data") of the drawing component 101, which represents an electronic whiteboard, are associated with each other (see Table 5).

The drawing component management unit 24 stores the drawing component management table as a file in the component data storage unit 32. A file name of the drawing component management file is, for example, "fig_parts_table_1.data."

Even when a subsequent stroke is not input by a user hand drafted input within a certain period of time after a stroke 104 that is the last stroke input (the point K is a start point and the point L is an end point) of the drawing component 101 of, which represents an electronic whiteboard, the drawing component management unit 24 determines that the drawing component 101 including the strokes up to the stroke 104 is a single drawing component.

Then, in FIG. 9A and FIG. 9B, the user hand drafted input of the drawing component 102, which represents a laptop PC ends. In a case that a user hand drafted input of a subsequent stroke is received, after the user hand drafted input of the stroke 105 that is the last stroke (the point S is a start point and the point T is an end point) is received, at a position separated from the corner of the drawing component 102 by a predetermined distance or more, or a case that no user hand drafted input of the subsequent stroke is received within a predetermined time after the user hand drafted input of the stroke 105 that is the last stroke (the point S is a start point and the point T is an end point) is received, the drawing component management unit 24 determines that the drawing component 102 includes the strokes up to the stroke 105, which is the last stroke, as a single drawing component.

The drawing component management unit 24 stores the stroke data (drawing attribute data such as a coordinate point sequence, a line thickness, and a color input by the contact position detection unit 21) of the drawing component 102, which represents a laptop PC, as a file in the component data storage unit 32. A file name of the file is, for example. "fig_parts_2.data."

The drawing component management unit 24 also assigns a drawing component ID=2 to the drawing component 102, which represents a laptop PC. The drawing component management unit 24 generates a drawing component management table in which the drawing component ID, the corner coordinate data indicated in Table 3, the inter-corner distance data indicated in Table 4, and the stroke data file ("fig_parts_2.data") of the drawing component 102, which represents a laptop PC, are associated with each other (see Table 5).

The drawing component management unit 24 adds the drawing component management table of the drawing component 102 to the drawing component management table (file name is "fig_parts_table_1.data") that is previously generated for the drawing component 101, and overwrites and saves the drawing component management table in the component data storage unit 32.

Table 5 indicates the generated drawing component management table. As described above, the drawing component management table includes drawing component IDs, stroke data file names of drawing components, corner coordinate data, and inter-corner distance data for all the drawing components being in a single screen (page).

TABLE 5

| | fig_parts_table_1.data | | |
|---|---|---|---|
| DRAWING COMPONENT ID | FILE NAME OF STROKED DATA OF DRAWING COMPONENT | CORNER COORDINATE DATA (ARRANGEMENT) | INTER-CORNER DISTANCE DATA (ARRANGEMENT) |
| 1 | fig_parts_1.data | COORDINATE DATA (ARRANGEMENT) INDICATED IN TABLE 1 | DISTANCE DATA (ARRANGEMENT) INDICATED IN TABLE 2 |
| 2 | fig_parts_2.data | COORDINATE DATA (ARRANGEMENT) INDICATED IN TABLE 3 | DISTANCE DATA (ARRANGEMENT) INDICATED IN TABLE 4 |

Figure 10:
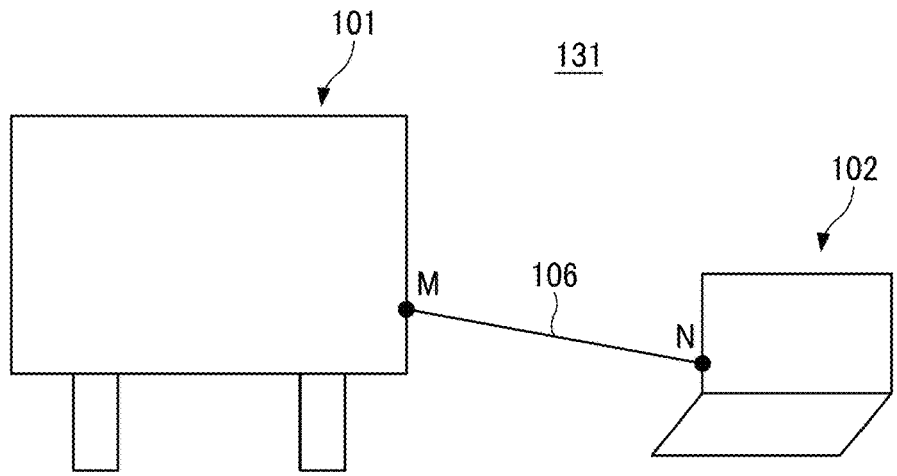
FIG. 10 is a diagram illustrating an example of a drawing, which is a whole drawing, in which the drawing components each of which represent one of an electronic whiteboard and a laptop PC are included, according to the first embodiment of the disclosure.

Storage of Drawing:

A description is given below of a method of storing a drawing, which is a whole drawing, with reference to FIG. 10. FIG. 10 is a diagram illustrating an example of a drawing, which is a whole drawing, in which the drawing component 101 and the drawing component 102, which represent an electronic whiteboard and a laptop PC, respectively, are included and are connected with a line 106, according to the present embodiment. After a predetermined time has elapsed since the user draws the drawing component 102, which represents a laptop PC, by a user hand drafted input, the user draws the line 106 connecting the drawing component 101, which represents an electronic whiteboard, and the drawing component 102, which represents a laptop PC. A point M indicates a start point and a point N indicates an end point.

Thereafter, in case that no user hand drafted input corresponding to the next stroke is performed within a certain period of time, the drawing component management unit 24 determines the line 106 as a single drawing component. However, in case that the drawing component is a single stroke as the line 106 that is a single stroke, the drawing component management unit 24 does not store a file for the drawing component being a single stroke. This is because a single stroke is included in all drawing components, and thus many stored drawing components come up in the search.

Then, a button, which is displayed on the display 220 of the display apparatus 2, for saving a drawing as a whole drawing is pressed according to a user operation. The button for saving a drawing as a whole drawing is a button for saving the objects (for example, stroke data, image, figure) being displayed on the display, namely a whole screen of the display, as a single page. In other words, the display apparatus 2 stores drawings, each of which is a whole drawing, in page units. This means the drawing to be stored as a whole drawing also includes, for example, a display button for creating a new page. Note that the objects corresponding to the stroke data, excluding the images and the figures may be saved. The drawing management unit 23 stores all stroke data (drawing attribute data such as a coordinate point sequence, a line thickness, and a color input by the contact position detection unit 21) illustrated in FIG. 10 as a file in the drawing data storage unit 31. A file name of the file is, for example, "figure_1.data." Then, the drawing management unit 23 assigns a drawing ID (drawing ID=1001) to the drawing, and generates a drawing management table in which the drawing ID, the file name of the drawing component management file "fig_parts_table_1.data," and the file name of the stroke data of the drawing "figure_1.data" are associated with each other.

The drawing management unit 23 stores the data of the drawing management table as a file in the drawing data storage unit 31. A file name of the drawing management file is, for example, "figure_table.data." This drawing management table is indicated as Table 6.

TABLE 6 figure_table.data

| DRAWING ID | FILE NAME OF DRAWING COMPONENT MANAGEMENT FILE | FILE NAME OF STROKE DATA OF DRAWING |
|---|---|---|
| 1001 | fig_parts_table_1.data | figure_1.data |

Drawing Component of Printer and Drawing Component of Laptop PC:

For example, in a meeting with respect to a printer, the user first draws a drawing component that represents a printer on the display 220 of the display apparatus 2.

Figure 11:
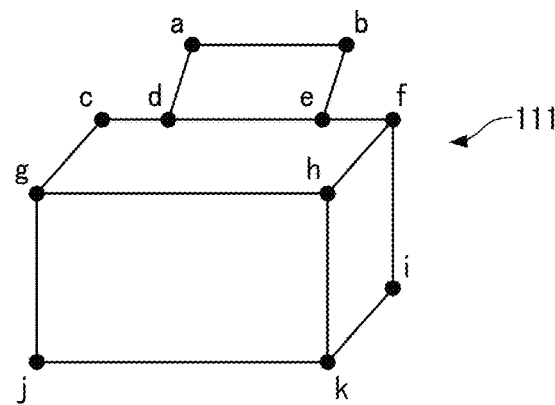
FIG. 11 is a diagram illustrating an example of a drawing component representing a printer, according to the first embodiment of the disclosure.

FIG. 11 is a diagram illustrating a drawing component 111 that represents a printer according to the present embodiment. Points a to k in FIG. 11 indicate corners of the drawing component 111, and the drawing component management unit 24 stores corner coordinate data indicated in Table 7 in the component data storage unit 32. The drawing component management unit 24 also obtains each distance between two corners and stores inter-corner distance data indicated in Table 8 in the component data storage unit 32. Table 7 may be obtained in substantially the same manner as Table 1 or Table 3, and Table 8 may be obtained in substantially the same manner as Table 2 or Table 4.

TABLE 7

Corner Coordinate Data

| CORNER | COORDINATES |
|---|---|
| a | (x31, y31) |
| b | (x32, y32) |
| c | (x33, y33) |
| d | (x34, y34) |
| ... | ... |
| k | (x41, y41) |

TABLE 8

Inter-Corner Distance Data

| CORNERS | INTER-CORNER DISTANCE |
|---|---|
| a, b | d31 |
| a, d | d32 |
| b, e | d33 |
| c, f | d34 |
| c, d | d35 |
| d, e | d36 |
| e, g | d37 |
| f, h | d38 |
| g, h | d39 |
| f, i | d40 |
| g, j | d41 |
| h, k | d42 |
| i, k | d43 |
| j, k | d44 |

Figure 12A:
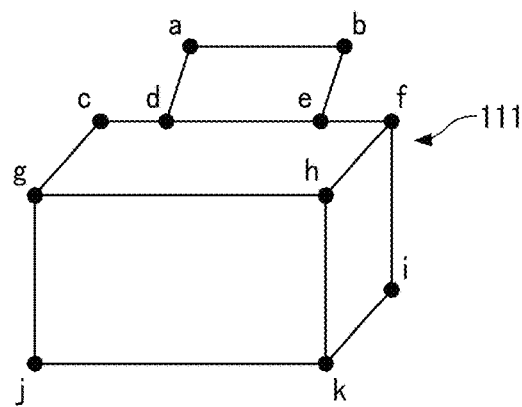
FIG. 12A and FIG. 12B are diagrams each illustrating one of the drawing component representing a printer and the drawing component representing a laptop PC, according to the first embodiment of the disclosure.
Figure 12B:
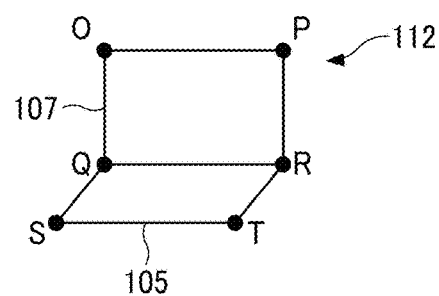

As illustrated in FIG. 12A and FIG. 12B, the user next draws a drawing component 112 that represent a laptop PC beside the drawing component 111, which represents a printer. The drawing component 112, which represent a laptop PC, illustrated in FIG. 12B is substantially the same as that illustrated in FIG. 9B.

When the user draws a stroke 107 that is the first stroke (the point O is the start point and the point Q is the end point) in order to draw the drawing component 112, which represents a laptop PC, the drawing component management unit 24 obtains a distance between the start point (point O) of the stroke 107 and a corner (point f) that is the closest to the point O among the corners of the drawing component Ill, which represents a printer, previously drawn. The drawing component management unit 24 also obtains a distance between the end point (point Q) of the stroke 107 and a corner (point i) that is the closest to the point O among the corners of the drawing component 111, which represents a printer, previously drawn. When each of the distances are equal to or greater than a predetermined value, the drawing component management unit 24 determines that the drawing component 111, which represents a printer, and the drawing component 112, which represents a laptop PC, are different drawing components.

The drawing component management unit 24 stores the stroke data (drawing attribute data such as a coordinate point sequence, a line thickness, and a color input by the contact position detection unit 21) of the drawing component 111, which represents a printer, as a file in the component data storage unit 32. A file name of the file is, for example, "fig_parts_3.data." The drawing component management unit 24 also assigns a drawing component ID=3 to the drawing component 111, which represents a printer. The drawing component management unit 24 generates a drawing component management table in which the drawing component ID, the corner coordinate data indicated in Table 7, the inter-corner distance data indicated in Table 8, and the stroke data file ("fig_parts_3.data") of the drawing component 111, which represents a printer, are associated with each other.

The drawing component management unit 24 stores the data of the drawing component management table as a file in the component data storage unit 32. A file name of the drawing component management file is, for example, "fig_parts_table_2.data" (see Table 9).

Then, the user draws the drawing component 112, which represents a laptop PC, by a user hand drafted input. In a case that a user hand drafted input of a subsequent stroke is received, after the user hand drafted input of the stroke 105 that is the last stroke (the point S is a start point and the point T is an end point) is received, at a position separated from the corner of the drawing component 112 by a predetermined distance or more, or a case that no user hand drafted input of the subsequent stroke is received within a predetermined time after the user hand drafted input of the stroke 105 that is the last stroke (the point S is a start point and the point T is an end point) is received, the drawing management unit 23 determines that the drawing component 112 includes the strokes from the stroke 107 to the stroke 105, which is the last stroke, as a single drawing component.

The drawing component management unit 24 stores the stroke data (drawing attribute data such as a coordinate point sequence, a line thickness, and a color input by the contact position detection unit 21) of the drawing component 112, which represents a laptop PC, as a file in the component data storage unit 32. A file name of the file is, for example, "fig_parts_4.data." The drawing component management unit 24 also assigns a drawing component ID=4 to the drawing component 112, which represents a laptop PC. The drawing component management unit 24 generates a drawing component management table in which the drawing component ID, the corner coordinate data indicated in Table 3, the inter-corner distance data indicated in Table 4, and the stroke data file ("fig_parts_4.data") of the drawing component 112, which represents a laptop PC, are associated with each other (see Table 9).

The drawing component management unit 24 adds the data of the drawing component management table of the drawing component to the drawing component management table (file name is "fig_parts_table_2.data") that is previously generated, and overwrites and saves the drawing component management table in the component data storage unit 32. This drawing management table is indicated as Table 9.

TABLE 9 fig_parts_table_2.data

| DRAWING COM- PONENT ID | FILE NAME OF STROKED DATA OF DRAWING COMPONENT | CORNER COORDINATE DATA (ARRANGEMENT) | INTER-CORNER DISTANCE DATA (ARRANGEMENT) |
|---|---|---|---|
| 3 | fig_parts_3.data | COORDINATE DATA (ARRANGEMENT) INDICATED IN TABLE 7 | DISTANCE DATA (ARRANGEMENT) INDICATED IN TABLE 8 |

TABLE 9-continued fig_parts_table_2.data

| DRAWING COM- PONENT ID | FILE NAME OF STROKED DATA OF DRAWING COMPONENT | CORNER COORDINATE DATA (ARRANGEMENT) | INTER-CORNER DISTANCE DATA (ARRANGEMENT) |
|---|---|---|---|
| 4 | fig_parts_4.data | COORDINATE DATA (ARRANGEMENT) INDICATED IN TABLE 3 | DISTANCE DATA (ARRANGEMENT) INDICATED IN TABLE 4 |

Figure 13:
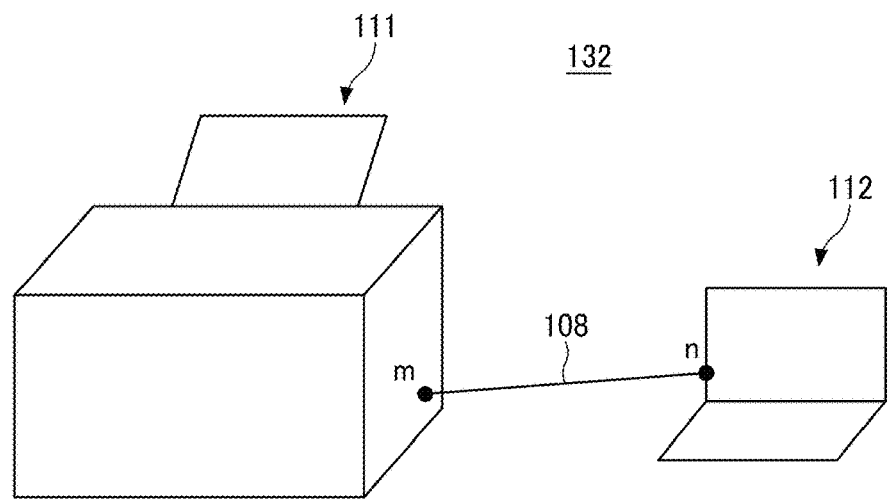
FIG. 13 is a diagram illustrating an example of a drawing, which is a whole drawing, in which the drawing components each of which represent one of a printer and a laptop PC are included, according to the first embodiment of the disclosure.

Storage of Drawing:

After a predetermined time has elapsed since the user draws the drawing component 112, which represents a laptop PC, by a user hand drafted input, the user draws a line 108 connecting the drawing component 111, which represents a printer, and the drawing component 112, which represents a laptop PC, as illustrated in FIG. 13. A point m indicates a start point and a point n indicates an end point. Thereafter, in case that no user hand drafted input corresponding to the next stroke is performed within a certain period of time, the drawing component management unit 24 determines the line 108 as a single drawing component. However, in case that the drawing component is a single stroke as the line 108 that is a single stroke, the drawing component management unit 24 does not store a file for the drawing component being a single stroke.

Then, a button, which is displayed on the display 220 of the display apparatus 2, for saving a drawing as a whole drawing is pressed according to a user operation. The drawing management unit 23 stores all stroke data (drawing attribute data such as a coordinate point sequence, a line thickness, and a color input by the contact position detection unit 21) illustrated in FIG. 13 as a file in the drawing data storage unit 31. A file name of the file is, for example, "figure_2.data." Then, the drawing management unit 23 assigns a drawing ID=1002 to the drawing, which is a whole drawing, of FIG. 13. Then, the drawing management unit 23 adds to, the drawing management table, a record in which the drawing ID, the file name of the drawing component management file "fig_parts_table_2.data," and the file name of the stroke data of the drawing "figure_2.data" are associated with each other.

The drawing management unit 23 overwrites the drawing diagram management file indicated as Table 6 (file name is "figure_table.data") with the data of the drawing diagram management table to be saved. The drawing management table that is overwritten is indicated as Table 10.

TABLE 10 figure_table.data

| DRAWING ID | FILE NAME OF DRAWING COMPONENT MANAGEMENT FILE | FILE NAME OF STROKE DATA OF DRAWING |
|---|---|---|
| 1001 | fig_parts_table_1.data | figure_1.data |
| 1002 | fig_parts_table_2.data | figure_2.data |

In Table 10, the drawing of FIG. 10 and the drawing component 101 and the drawing component 102 included in the whole drawing are associated with each other with the drawing diagram ID=1001. In addition, in Table 10, the drawing of FIG. 13 and the drawing component 111 and the drawing component 112 included in the whole drawing are associated with each other with the drawing diagram ID=1002.

At the end of a conference or a meeting (when the user presses a conference end button), the drawing management unit 23 may execute the above-described processing for saving a drawing as a whole drawing.

In addition, in a case of the display apparatus 2 having a page switching function, when the user performs a page switching operation, the drawing management unit 23 may execute the above-described processing for saving a drawing as a whole drawing.

Searching Drawing Component:

Next, when the user starts drawing on the display 220 of the display apparatus 2, the drawing comparison unit 25 compares a drawing component being drawn by a user hand drafted input with the stored drawing components to determine the similarity, and displays a drawing having a drawing component similar to the drawing component being drawn. A description is given below of a process of searching a drawing component and displaying a drawing, which is a whole drawing.

When another drawing component is drawn by a user hand drafted input, the drawing component management unit 24 newly assigns a drawing component ID (drawing component ID=5) and associates the drawing component ID with the stroke data, the corner coordinate data, and the inter-corner distance data in substantially the same manner as described above. In other words, the drawing component management unit 24 creates a single record of the drawing component management table as illustrated in Table 5 or Table 9.

Then, the drawing component management unit 24 reads out to the RAM 203, the drawing management file (ile name is "figure_table.data") stored in the drawing data storage unit 31. Then, the drawing component management unit 24 further uses the rile name of the drawing component management file included in the drawing management file to read out to the RAM 203 all the drawing component management files stored in the component data storage unit 32 (the drawing component management table).

Subsequently, the drawing component management unit 24 requests the drawing comparison unit 25 to perform a process of comparing the corner coordinates and the inter-corner distance of the drawing component (drawing component ID=5) with respect to the drawing component management table read out to RAM 203.

The drawing comparison unit 25 uses the corner coordinate data and the inter-corner distance data to determine the similarity between the drawing component 5 (drawing component ID=5) and a drawing component stored in the component data storage unit 32. For example, the drawing comparison unit 25 first narrows down the comparison targets by determining whether the number of elements of the inter-corner distance data matches or not. The comparison targets narrowed by the process performed by the drawing comparison unit 25 may include not only ones having the numbers of elements that matches, but also ones having the numbers of elements that are close.

Next, the drawing comparison unit 25 regards a pair of corners listed in the inter-corner distance data as a start point and an end point of a vector, and calculates cosine similarity (cosine similarity degree) with respect to the vectors of two drawing components in the order described in the inter-corner distance data.

The cosine similarity is an index indicating how the two vectors are oriented in the same direction. Since the cosine similarity directly expresses the closeness of the angle formed by the vectors, the closer to 1 a value of the cosine similarity is, the higher the similarity degree becomes, and the closer to 0 the value of the cosine similarity is, the lower the similarity degree becomes, as in the cosine of a trigonometric function.

The drawing comparison unit 25 determines presence of the similarity if a value of the cosine similarity is equal to or greater than a threshold value (for example, 0.7) for all vectors in the inter-corner distance data. Note that the drawing comparison unit 25 may determine the presence of the similarity if an average value of cosine similarity between all corner pairs of the inter-corner distance data is equal to or greater than a threshold value (for example, 0.7).

An example of determination on similarity based on the cosine similarity is described below.

The following Table 11 and Table 12 respectively indicate data of head of corner coordinate data and data of head inter-corner distance data of the stored drawing component 1 (drawing component ID=1) (head of Table 1 and head of Table 2). Table 13 and Table 14 are respectively data of head of the corner coordinate data and data of head of the inter corner distance data of a drawing component currently drawn by a user hand drafted input.

TABLE 11

| Corner Coordinate Data | |
|---|---|
| CORNER | COORDINATES |
| A | (x1, y1) |
| B | (x2, y2) |
| C | (x3, y3) |

TABLE 12

| Inter-Corner Distance Data | |
|---|---|
| CORNERS | INTER-CORNER DISTANCE |
| A, B | d1 |
| A, C | d2 |

TABLE 13

| Corner Coordinate Data | |
|---|---|
| CORNER | COORDINATES |
| α | (x100, y100) |
| β | (x101, y101) |
| γ | (x102, y102) |

TABLE 14

| Inter-Corner Distance Data | |
|---|---|
| CORNERS | INTER-CORNER DISTANCE |
| α, β | d100 |
| α, γ | D101 |

The drawing comparison unit 25 compares the drawing component 5 (drawing component ID=5) drawn by a user hand drafted input with the drawing component 1 (drawing component ID=1) using Table 11 to Table 14. In the following description, a vector is represented by enclosing two corners with brackets.

The vector of a first pair of corners of the drawing component 1 is (AB)=(x2−x1, y2−y1).

The vector of a second pair of corners of the drawing component 1 is (AC)=(x3−x1, y3−y1).

The vector of a first pair of corners of the drawing component 5 is (aft)=(x101−x100, y101−y100).

The vector of a second pair of corners of the drawing component 5 is (αγ)=(x102−x100, y102−y100).

The cosine similarity between the first pairs of corners is obtained by equation (1). The cosine similarity between the second pairs of corners is obtained by equation (2).

$$0 \le \frac{\overrightarrow{AB} \cdot \overrightarrow{\alpha\beta}}{|\overrightarrow{AB}| \cdot |\overrightarrow{\alpha\beta}|} = \frac{\overrightarrow{AB} \cdot \overrightarrow{\alpha\beta}}{d_1 \cdot d_{100}} \le 1 \quad \text{Equation (1)}$$

$$0 \le \frac{\overrightarrow{AC} \cdot \overrightarrow{\alpha\gamma}}{|\overrightarrow{AC}| \cdot |\overrightarrow{\alpha\gamma}|} = \frac{\overrightarrow{AC} \cdot \overrightarrow{\alpha\gamma}}{d_2 \cdot d_{101}} \le 1 \quad \text{Equation (2)}$$

If both of the equations (1) and (2) are equal to or greater than a threshold value (for example, 0.7), the drawing comparison unit 25 determines that there is similarity.

As described above, the drawing comparison unit 25 compares the drawing component 5 with each drawing component (drawing component IDs=1 to 4). When the drawing component 5 is a drawing component that represents a laptop PC, the drawing component 5 is determined to be similar to each of the drawing component identified by the drawing component ID=2 and the drawing component identified by the drawing component ID=4.

The drawing comparison unit 25 notifies the drawing component management unit 24 of the drawing component IDs=2 and 4 determined to have similarity. The drawing component management unit 24 notifies the drawing management unit 23 of the file names of the drawing component management files each having one of the notified drawing component IDs.

The drawing management unit 23 reads out the stroke data files ("figure_1.data" and "figure_2.data") of the drawings each associated with the corresponding file name in the drawing management table, and the drawing data generation unit 22 generates the drawing lines of the strokes according to the drawing attributes such as line thickness and color. Then, the drawing data generation unit 22 reduces a size of each drawing to be in a list dialog 130, and the display control unit 26 causes the display 220 to display the list dialog 130.

When the user draws the drawing component that represents a laptop PC, the two drawings of FIG. 10 and FIG. 13 match in the search, so that the display control unit 26 displays the two drawings in the list dialog 130. A display example of this is illustrated in FIG. 14A, FIG. 14B and FIG. 14B.

Figure 14A:
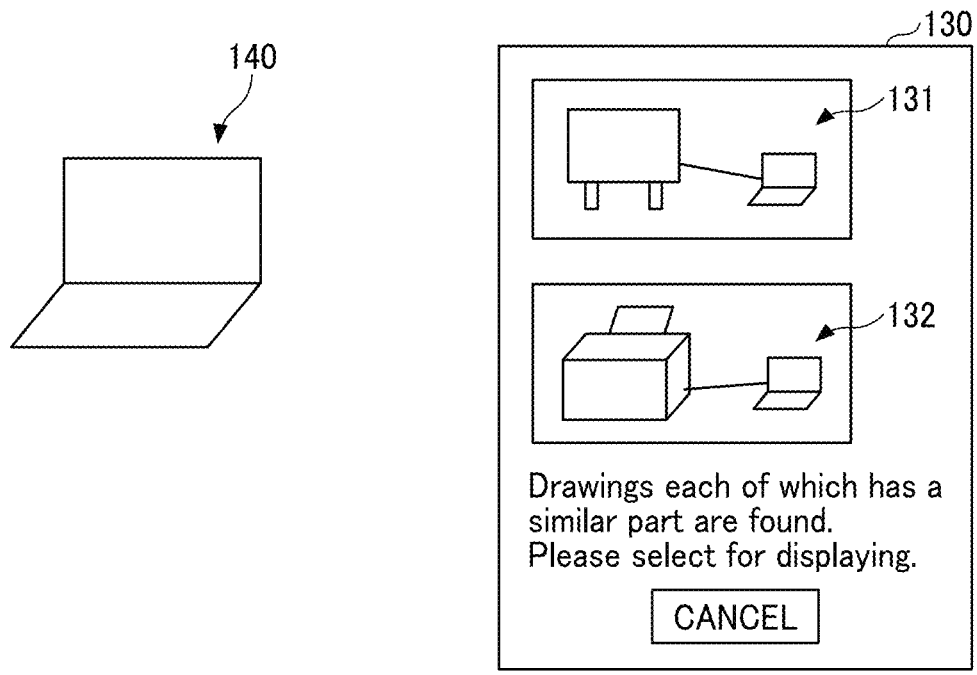
FIG. 14A is a diagram illustrating an example of a display screen including a list dialog, according to the present embodiment.

FIG. 14A is a diagram illustrating an example of a display screen including the list dialog 130, according to the present embodiment. In the example of FIG. 14A, a drawing component 140 that represents a laptop PC being currently drawn by a user hand drafted input and the list dialog 130 are displayed. The list dialog 130 also has two drawings (overall views, a whole drawing) that are a drawing 131 and a drawing 132 each of which includes a drawing component similar to the drawing component 140, which represents a laptop PC.

Figure 14B:
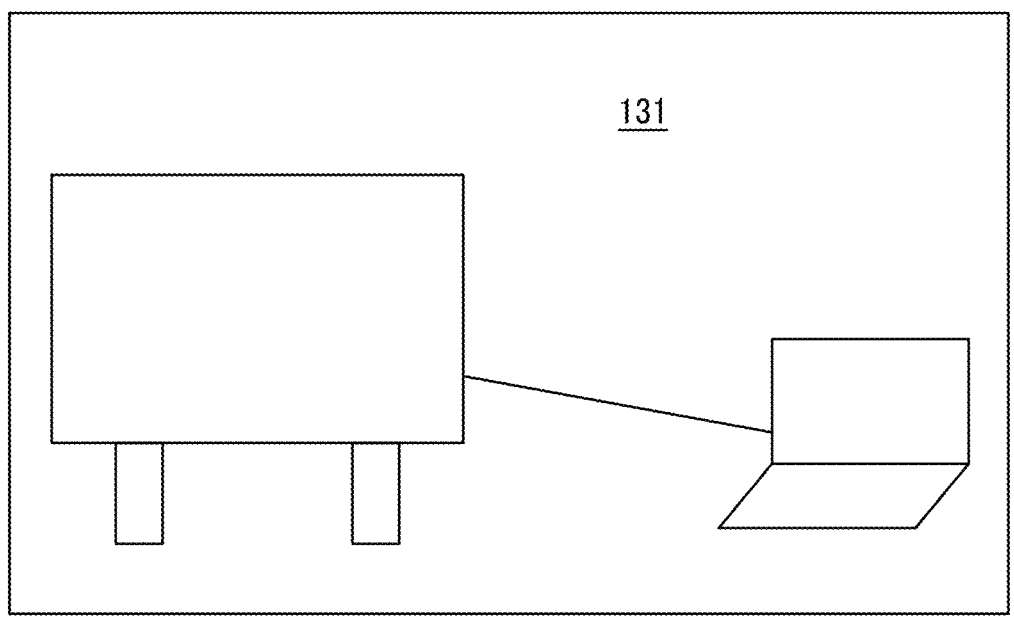
FIG. 14B is a diagram illustrating another example of a display screen that is displayed according to a user operation performed with respect to the list dialog, according to the first embodiment of the disclosure.

When the user selects the drawing 131 including diagrams (drawing components) of an electronic whiteboard and a laptop PC displayed on the list dialog 130, the drawing management unit 23 deletes the list dialog 130 and displays the drawing 131 (drawing diagram ID=1001) including diagrams (drawing components) of an electronic whiteboard and a laptop PC (FIG. 14B).

Figure 15:
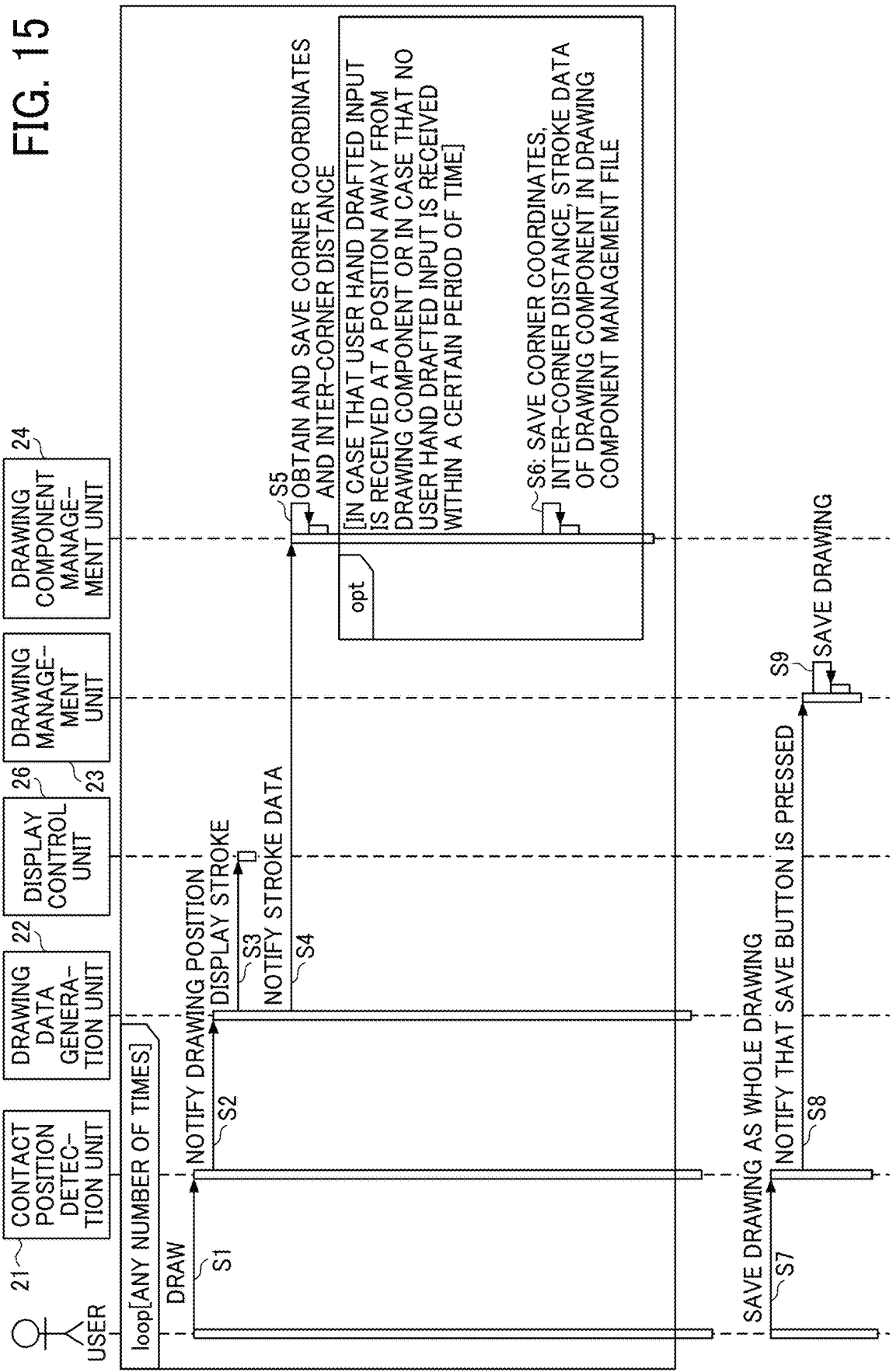
FIG. 15 is a sequence diagram illustrating an example of a process of saving a drawing component and a drawing that is a whole drawing based on hand drafted data input by a user hand drafted input, according to the first embodiment of the disclosure.

Operation of Display Apparatus:

FIG. 15 is a sequence diagram illustrating an example of a process of saving a drawing component and a drawing that is a whole drawing based on hand drafted data input by a user hand drafted input.

S1: When the user moves the tip end of the input device 291 in contact with the display 220, the contact position detection unit 21 receives an input of a stroke.

S2: The contact position detection unit 21 notifies the drawing data generating unit 22 of the detected coordinate point sequence.

S3: The drawing data generation unit 22 generates hand drafted data (stroke data) by, for example, interpolating or smoothing the coordinate point sequence. The drawing data generation unit 22 notifies the display control unit 26 of the generated stroke data. The display control unit 26 causes the display 220 to display the stroke data.

S4: The drawing data generation unit 22 further notifies the drawing component management unit 24 of the stroke data.

S5: The drawing component management unit 24 generates corner coordinate data in which coordinates of corners are registered and inter-corner distance data.

S6: The drawing component management unit 24 generates the drawing component management table when a predetermined condition is satisfied. The predetermined condition is, for example, in case that a user hand drafted input of a next stroke is received at a position separated from the corner of the drawing component by a predetermined distance or more or in case that no user hand drafted input of a next stroke is received within a predetermined time after the last stroke is drawn by a user hand drafted input. The drawing component management unit 24 determines that the stroke data received by the contact position detection unit 21 from a time when the predetermined condition is satisfied last to another time when the predetermined condition is satisfied subsequently is corresponding to a single drawing component.

In the drawing component management table, the drawing component ID, the corner coordinate data, the inter-corner distance data, and the file name of the stroke data of the drawing component are associated with each other. The drawing component management unit 24 stores the drawing component management table as a file in the component data storage unit 32.

S7: A button, which is displayed on the display 220 of the display apparatus 2, for saving a drawing as a whole drawing (save button) is pressed according to a user operation.

S8: The contact position detection unit 21 notifies the drawing management unit 23 that the save button has been pressed.

S9: The drawing management unit 23 stores all stroke date being displayed on the display 220 as a file in the drawing data storage unit 31. Then, the drawing management unit 23 assigns a drawing ID to the drawing, and saves a drawing management file in which the drawing ID, the file name of the drawing component management file, and the file name of the stroke data of the drawing are associated with each other (if there is already a drawing management file, overwrites, or updates, the drawing management file).

Figure 16:
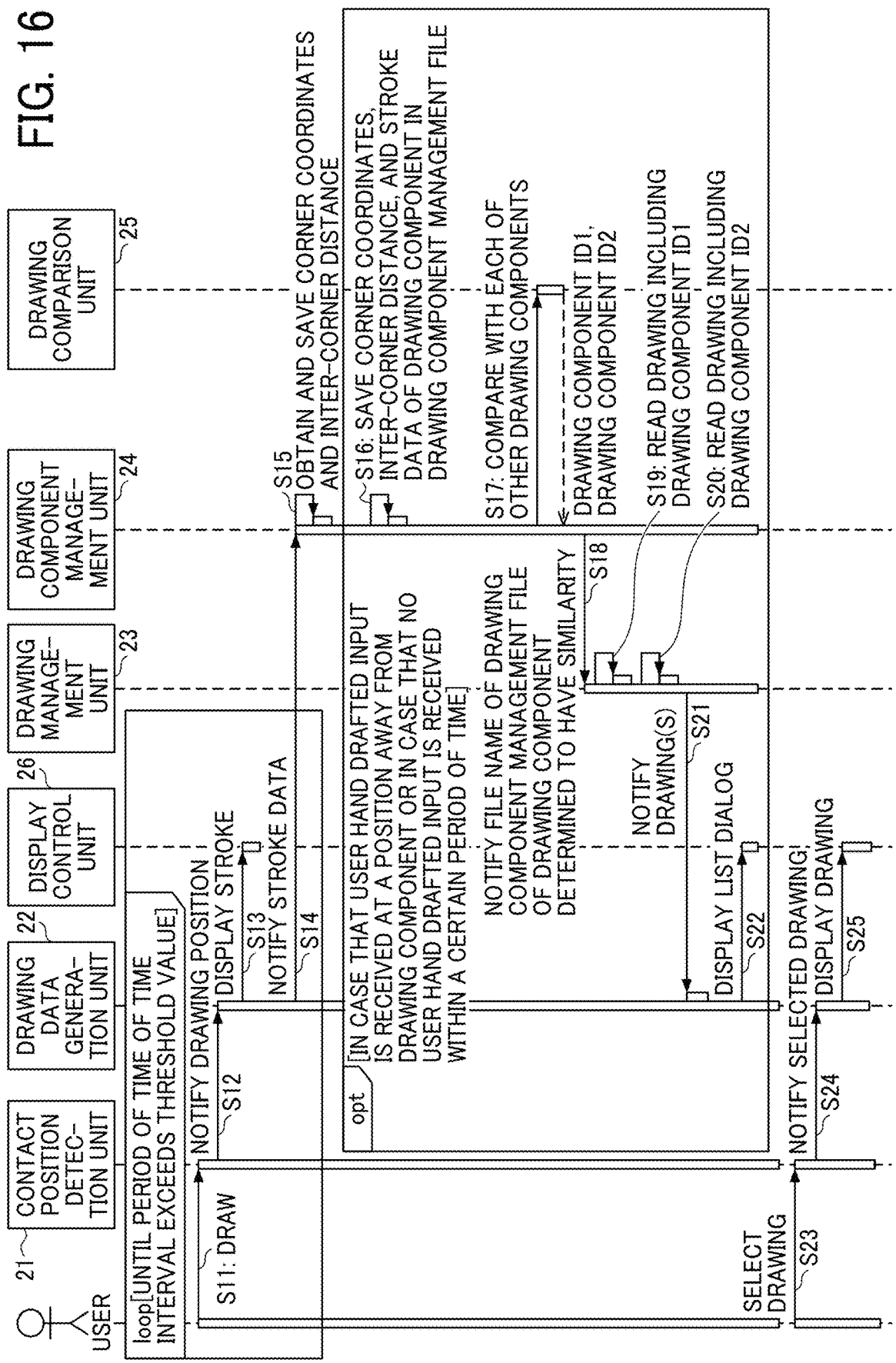
FIG. 16 is a sequence diagram illustrating an example of a process, performed by the display apparatus, of displaying a drawing, which is a whole drawing, including a drawing component having similarity to a drawing component currently drawn by a user hand drafted input, according to the first embodiment of the disclosure.

FIG. 16 is a sequence diagram illustrating an example of a process, performed by the display apparatus 2, of displaying a drawing, which is a whole drawing, including a drawing component having similarity to a drawing component currently drawn by a user hand drafted input.

S11 to S16: The processing is substantially the same as that of steps S1 to S6 in FIG. 15.

S17: The drawing component management unit 24 requests the drawing comparison unit 25 to compare the drawing component stored in step S16 with the drawing component stored in the component data storage unit 32. The drawing comparison unit 25 responses, to the drawing component management unit 24, with a drawing component ID of a drawing component having similarity to the drawing component stored in step S16 based on, for example, the cosine similarity.

S18: The drawing component management unit 24 notifies the drawing management unit 23 of a file name of a drawing component management file of the drawing component ID determined to have similarity.

S19 and S20: The drawing management unit 23 reads out a drawing management file (whole drawing) having the file name of the drawing component management file from the drawing data storage unit 31.

S21: The drawing managing unit 23 notifies the drawing data generation unit 22 of the drawing management file that has been read.

S22: The drawing data generation unit 22 generates a drawing, which is a whole drawing, using the stroke data included in the drawing management file, and requests the display control unit 26 to display the list dialog 130 including the drawing. As a result, the display control unit 26 displays the list dialog 130 including each diagram having a reduced size such as a thumbnail on the display 220.

S23: The user presses one of the drawings with the input device 291.

S24: The contact position detection unit 21 identifies the selected drawing by the coordinates at which the tip of the input device 291 contacts (touches). The contact position detection unit 21 notifies the drawing data generation unit 22 of the drawing.

S25: The drawing data generation unit 22 requests the display control unit 26 to display the drawing. The display control unit 26 displays the drawing on the display 220.

Figure 17:
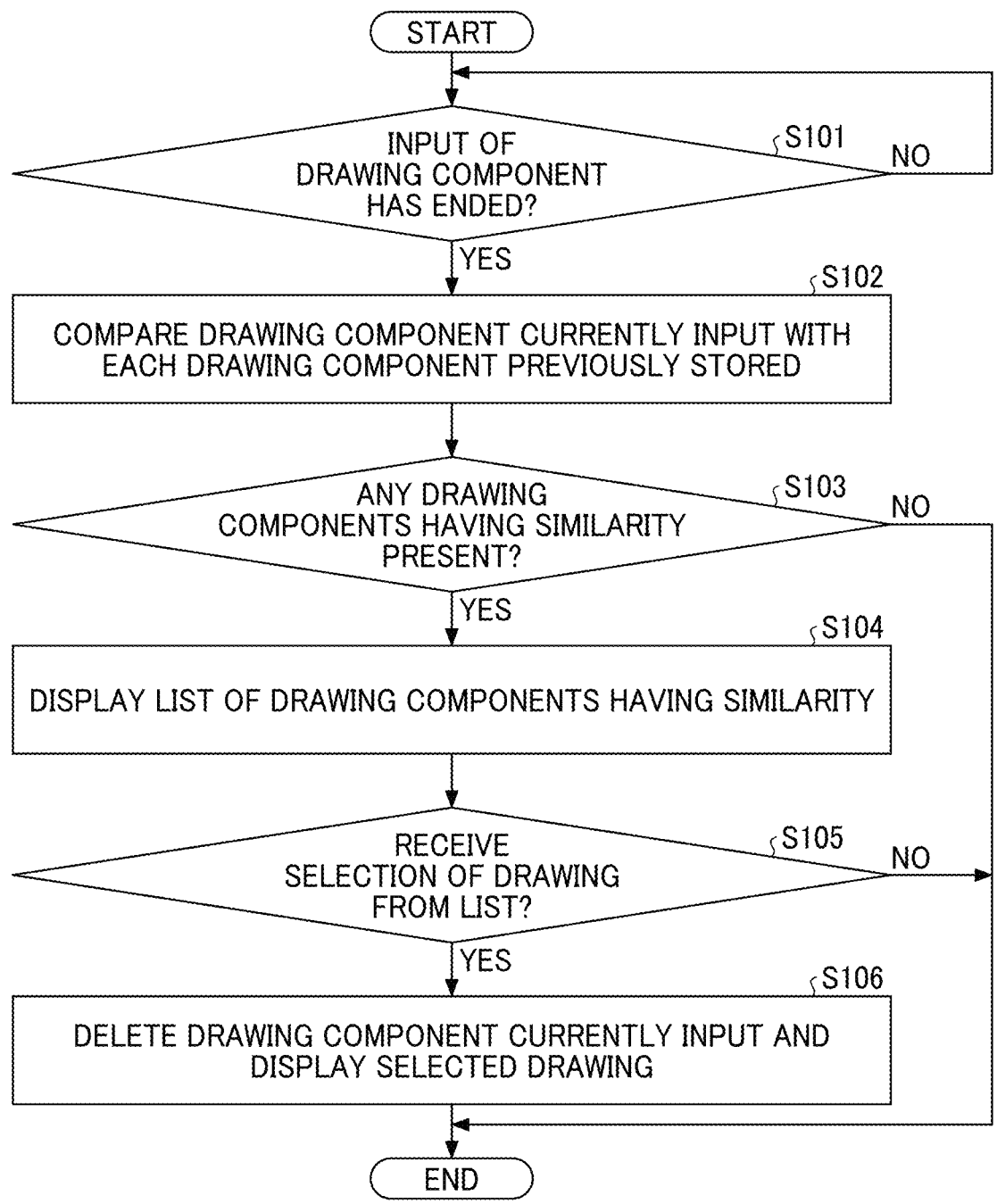
FIG. 17 is a flowchart illustrating an example of a flow of the process of FIG. 16, according to the first embodiment of the disclosure.

FIG. 17 is a flowchart illustrating an example of a flow of the process of FIG. 16.

The drawing component management unit 24 determines that a current hand drafted input of a drawing component ends when another hand drafted input of a next stroke is received at a position separated from the corner of the current drawing component by a predetermined distance or more or when no user hand drafted input of a next stroke is received within a certain period of time after the last stroke is drawn by a user hand drafted input (S101).

Subsequently, the drawing comparison unit 25 compares the drawing component of which the user hand drafted input has just finished with drawing components of a drawing stored in the drawing data storage unit 31 (S102).

When there is a drawing component having similarity to the drawing component of which the user hand drafted input has just finished in the drawing components of the drawing (Yes in S103), the display control unit 26 displays the list dialog 130 on the display 220 (S104). The list dialog 130 includes drawings each of which including a drawing component having the similarity and displayed with a reduced size to be such as a thumbnail.

Then, when the user presses one of the drawings in the list with the input device 291 (Yes in S105), the contact position detection unit 21 receives a selection of the drawing based on the coordinates with which the tip of the input device 291 comes into contact, and the display control unit 26 displays the drawing on the display 220 (S106).

As described above, the display apparatus according to the present embodiment stores the drawing as a whole drawing, which is namely an overall view, and each drawing component included in the drawing. After that, when receiving a user hand drafted input of drawing a drawing component, the display apparatus compares the drawing component with the stored drawing components, and if there is a drawing component having a high degree of similarity (similarity degree) in the stored drawing components, displays the drawing, which is a whole drawing, including the drawing component having the high degree of similarity (similarity degree). This allows the user to use the drawing that is drawn in the past by drawing a part of the drawing to call up the drawing, which is a whole drawing.

Second Embodiment

In the first embodiment, the similarity between a drawing component input by a user hand drafted input with each of the drawing components stored as a part of the whole drawing is compared. However, it is preferable to narrow down the search targets (data to be compared) because it takes time to perform comparison when an amount of stored data in relation to the drawing increases. In addition, in a case where the confidentiality of the drawing is high, the user who has stored the drawing may desire to limit the number of persons who can access the drawing.

In view of the above, a display apparatus 2 according to a second embodiment uses a user ID to search for drawings that are created by a user identified by the user ID in the past.

Figure 18:
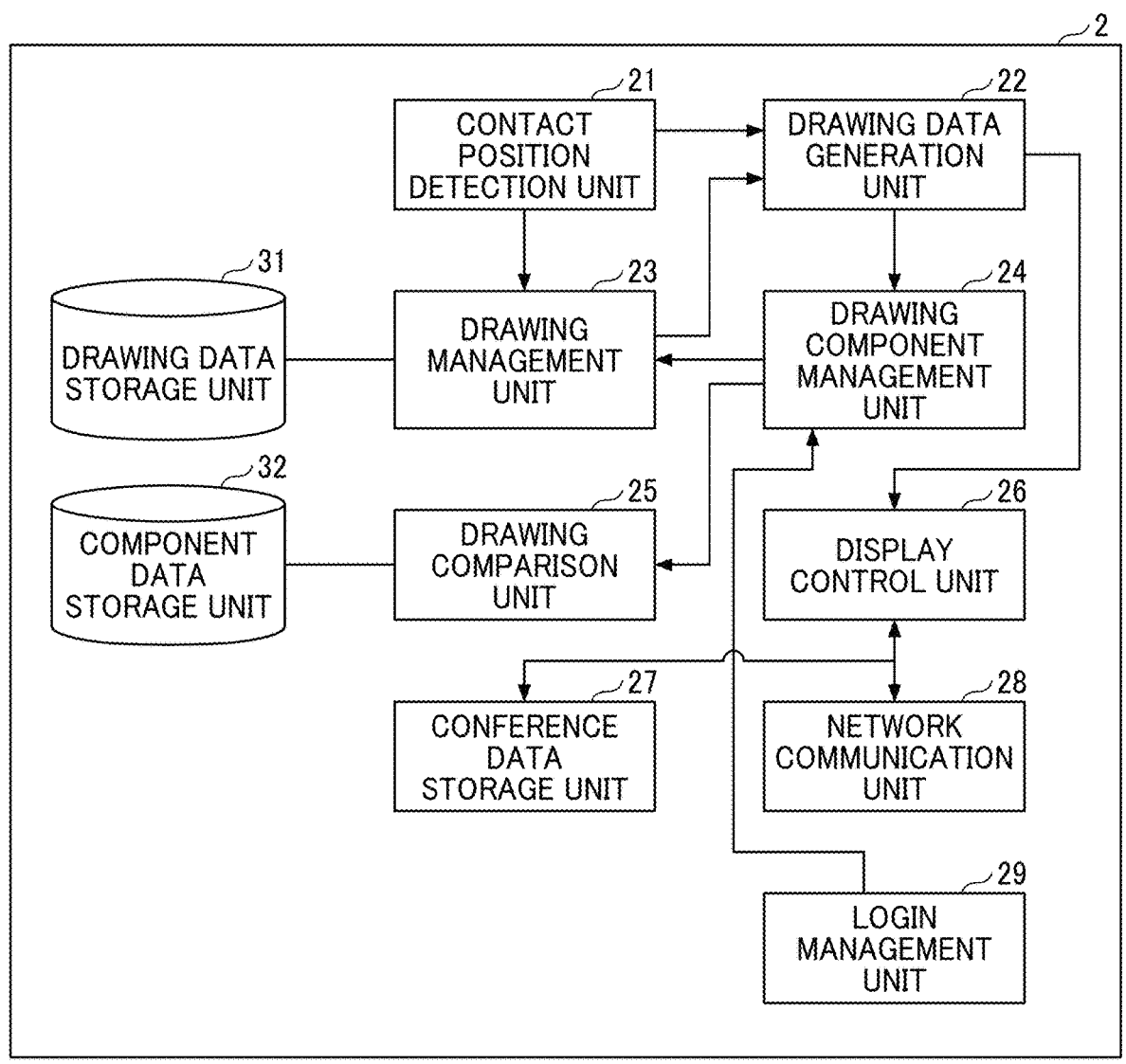
FIG. 18 is a block diagram illustrating an example of a functional configuration of a display apparatus according to a second embodiment of the disclosure.

Functions:

FIG. 18 is a block diagram illustrating an example of a functional configuration of the display apparatus 2 according to the present embodiment. In the following description of FIG. 18, differences from FIG. 4 are described.

The display apparatus 2 of the present embodiment includes a login management unit 29. The login management unit 29 performs authentication by making an inquiry to an authentication database configured in the SSD 204 based on the user ID stored in an integrated circuit (IC) card of the user and received by the IC card reading device (corresponding to the short-range communication circuit 219 in FIG. 3) via NFC. The drawing management unit 23 and the drawing component management unit 24 store each drawing component and the drawing in association with the authenticated user ID.

The login management unit 29 may perform authentication using the user ID and a password input by the user using a hardware keyboard or a software keyboard displayed on a touch panel, instead of performing authentication based on the user ID stored in the IC card. In addition, the login management unit 29 may perform biometric authentication. The method for the authentication is not limited.

Further, an inquiry destination of the user ID may not be the SSD built in the display apparatus 2, and the display apparatus 2 may make an inquiry to another authentication server.

Figure 19:
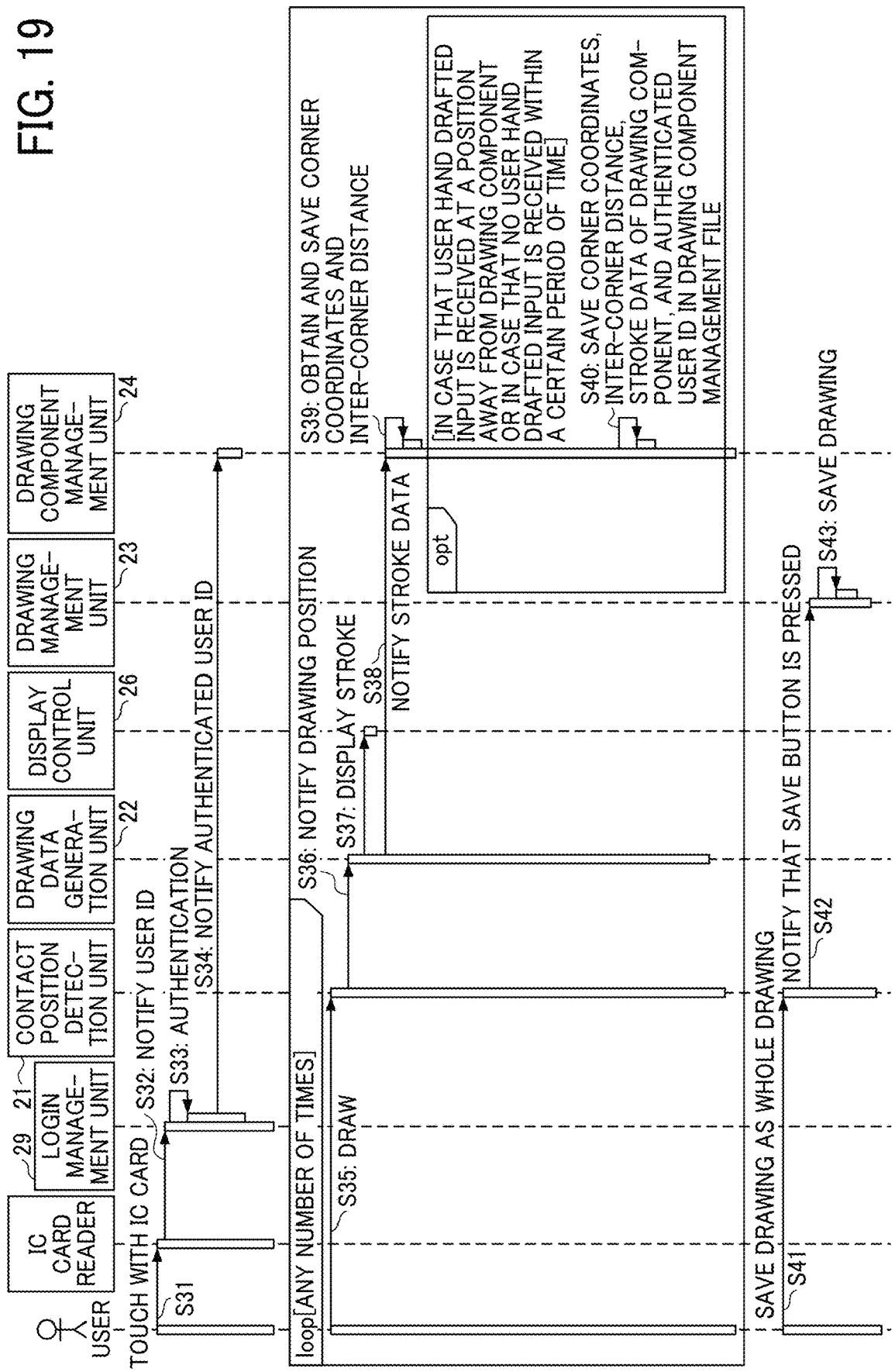
FIG. 19 is a sequence diagram illustrating an example of a process of saving a drawing component and a drawing that is a whole drawing based on hand drafted data input by a user hand drafted input, according to the second embodiment of the disclosure.

Process:

FIG. 19 is a sequence diagram illustrating an example of a process of saving a drawing component and a drawing that is a whole drawing based on hand drafted data input by a user hand drafted input. In the following description of the example of FIG. 19, differences from the example of FIG. 15 are described.

S31: The user holds an IC card over an IC card reading device (IC card reader).

S32: The IC card reader (short-range communication circuit 219) receives the user ID from the IC card. The login management unit 29 acquires the user ID from the short-range communication circuit 219.

S33: The login management unit 29 performs user authentication based on the user ID.

S34: When the authentication is successful, the login management unit 29 notifies the drawing component management unit 24 of the user ID.

The subsequent processing is substantially the same as the processing of FIG. 15 except for step S40. In step S40, the drawing component management unit 24 stores the drawing component management table with the user ID in association with each other as a file in the component data storage unit 32.

As an example of the drawing component management table in a case where the user ID is 0001 and there are two drawing components is indicated as Table 15.

TABLE 15 figure_parts_table.data

| DRAWING COMPONENT ID | USER ID | FILE NAME OF STROKE DATA OF DRAWING COMPONENT | CORNER COORDINATE DATA (ARRANGEMENT) | INTER-CORNER DISTANCE DATA (ARRANGEMENT) |
|---|---|---|---|---|
| 1 | 0001 | fig_parts_1.data | COORDINATE DATA (ARRANGEMENT) | DISTANCE DATA (ARRANGEMENT) |
| 2 | 0001 | fig_parts_2.data | COORDINATE DATA (ARRANGEMENT) | DISTANCE DATA (ARRANGEMENT) |

As compared with Table 5 or Table 9, a data item of user ID is added to the drawing component management table of Table 15. The drawing comparison unit 25 searches for drawing components associated with a user ID same as the user ID of the user who has logged in.

Figure 20:
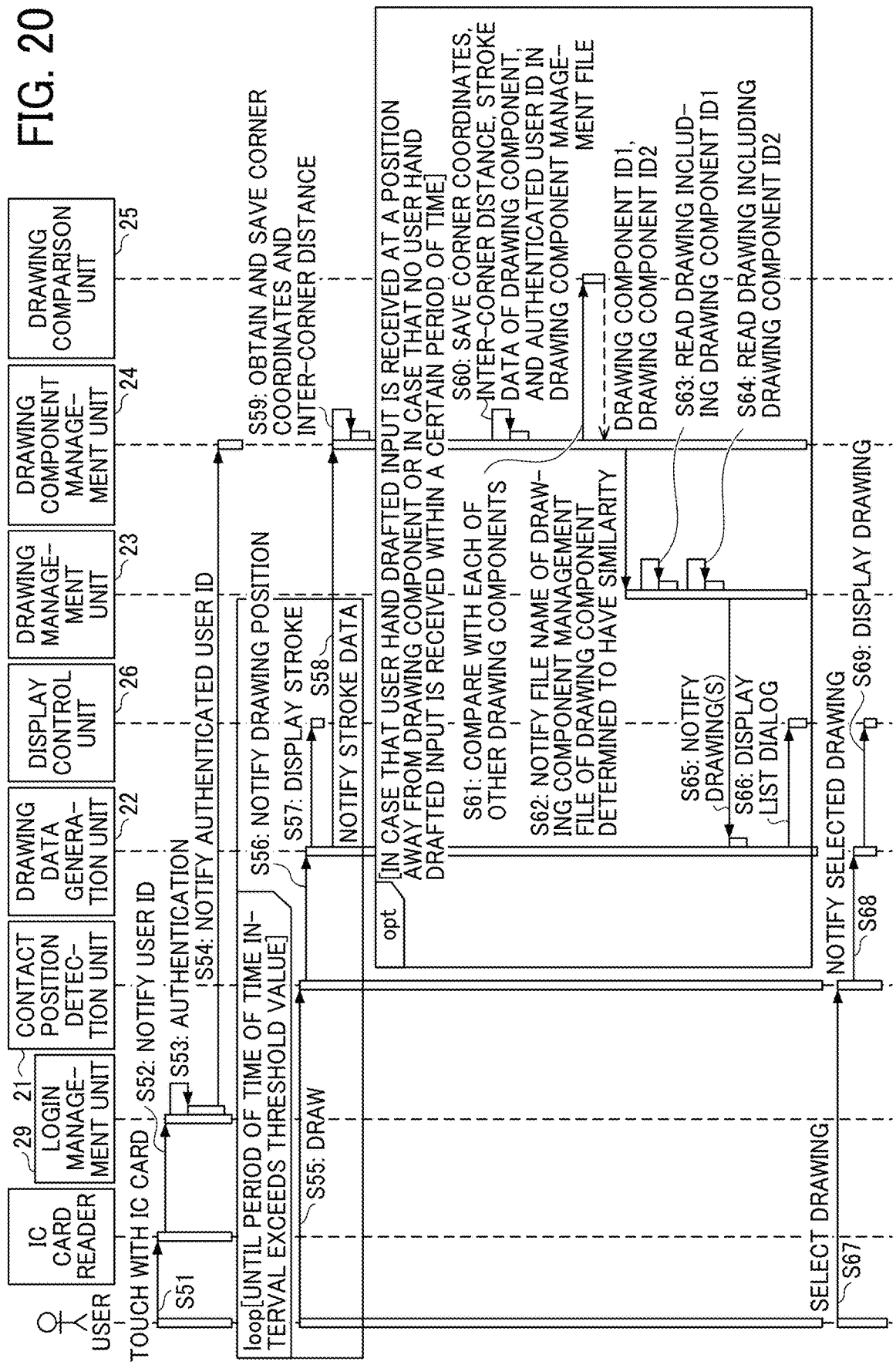
FIG. 20 is a sequence diagram illustrating an example of a process, performed by the display apparatus, of displaying a drawing, which is a whole drawing, including a drawing component having similarity to a drawing component currently drawn by a user hand drafted input, according to the second embodiment of the disclosure.

FIG. 20 is a sequence diagram illustrating an example of a process, performed by the display apparatus 2, of displaying a drawing, which is a whole drawing, including a drawing component having similarity to a drawing component currently drawn by a user hand drafted input. In the following description on FIG. 20, the differences from FIG. 16 are described.

S51 to S54: The login procedure may be substantially the same as that in FIG. 19.

S55 to S60: The processing of steps S55 to S60 may be substantially the same as the processing of steps S35 to S40 of FIG. 19.

S61: The drawing component management unit 24 requests the drawing comparison unit 25 to compare a drawing component currently drawn by a user hand drafted input by the user with each drawing component that is associated with the user ID of the user who has logged in.

In this way, the drawing comparison unit 25 compares the drawing components associated with the user ID of the logged-in user with the drawing component currently drawn by a user hand drafted input. This allows the display apparatus 2 to reduce the time taken for the comparison, and limit users who can view the drawing even when the confidentiality of the drawing is high.

Subsequent processing may be substantially the same as the processing in FIG. 16.

In addition to the effects of the first embodiment, the display apparatus 2 according to the present embodiment reduces the time taken for the display apparatus 2 to search for the drawing components, and limits users who can view the entire drawing even when the confidentiality of the drawing is high.

The display apparatus 2 may search for the drawing components associated with users who belong to the same group, such as a department or a team, in alternative to searching for the drawing components associated with a specific user ID. Alternatively, the user may assign a security level to a drawing component, and the display apparatus may search for drawing components each having a security level equal to or less than a certain level.

Third Embodiment

A configuration of a display system, which performs one or more of the above-described processes, according to a third embodiment, is described below.

First Example of Configuration of Display System:

Although the display apparatus 2 according to the present embodiment is described as that having a large touch panel, the display apparatus 2 is not limited thereto.

Figure 21:
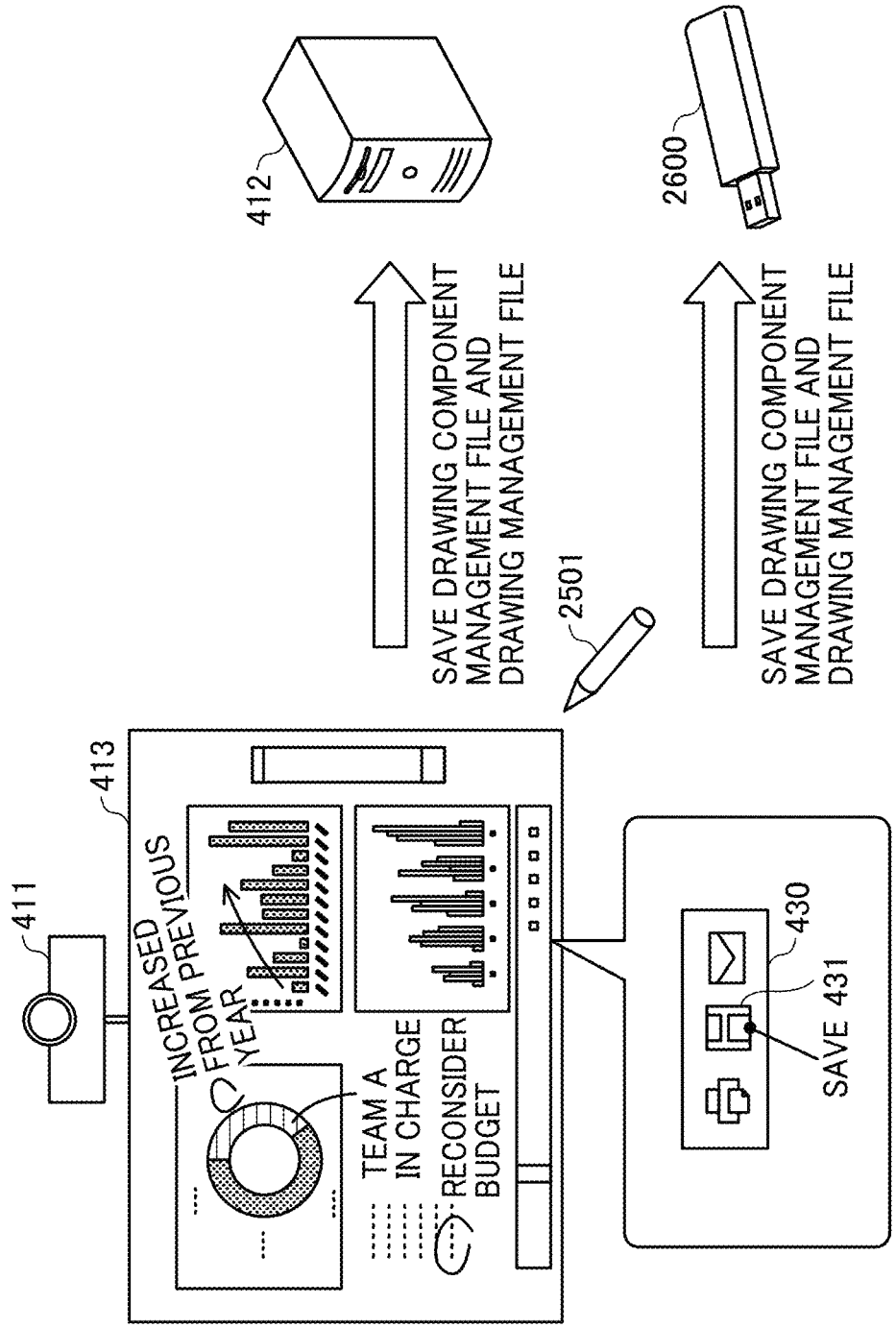
FIG. 21 is a diagram illustrating a configuration of a display system according to a third embodiment of the disclosure.

FIG. 21 is a diagram illustrating an example of the configuration of the display system according to a third embodiment. The display system includes a projector 411, a screen 413 (such as a whiteboard), and a server 412, and the projector 411 and the server 412 are communicably connected to each other via a network. The projector 411 mainly operates as the display apparatus 2 described above. The projector 411 is a general-purpose projector, but installed with software that causes the projector 411 to function as each function of the display apparatus 2 described above with reference to FIG. 4. The server 412 or an external memory, such as a USB memory 2600, may serve as a function corresponding to the storage function of the display apparatus 2. Note that the screen 413 may be a blackboard, and may be simply a plane having an area large enough to project an image.

The projector 411 employs an ultra short-throw optical system and projects an image (video) with reduced distortion from a distance of about 10 cm to the screen 413. This video may be transmitted from a PC connected wirelessly or by wire, or may be stored in the projector 411.

The user writes or draws on the screen 413 using a dedicated electronic pen 2501. The electronic pen 2501 includes a light-emitting element, for example, at a tip thereof. When a user presses the electronic pen 2501 against the screen 413 for handwriting, a switch is turned on, and the light-emitting portion emits light. The wavelength of light of the light-emitting element is near-infrared or infrared that is invisible to a user. The projector 411 includes a camera. The projector 411 captures, with the camera, an image of the light-emitting element, analyzes the image, and determines the direction of the electronic pen 2501. Thus, the contact position detection unit 21 (illustrated in FIG. 4), implemented by the camera, receives the light as the signal indicating that the electronic pen 2501 is pressed against the screen 413. Further, the electronic pen 2501 emits a sound wave in addition to the light, and the projector 411 calculates a distance based on an arrival time of the sound wave. The projector 411 determines the position of the electronic pen 2501 based on the direction and the distance. Hand drafted data, which includes handwritten data, is drawn (projected) at the position of the electronic pen 2501.

The projector 411 projects a menu 430. When the user presses a button of the menu 430 with the electronic pen 2501, the projector 411 determines the pressed button based on the position of the electronic pen 2501 and the ON signal of the switch. For example, when a save button 431 is pressed, hand drafted input data (coordinate point sequence) input by the user is saved in the projector 411. The projector 411 stores the hand drafted information in, for example, the server 412 or the USB memory 2600, which is set in advance.

Fourth Embodiment

Figure 22:
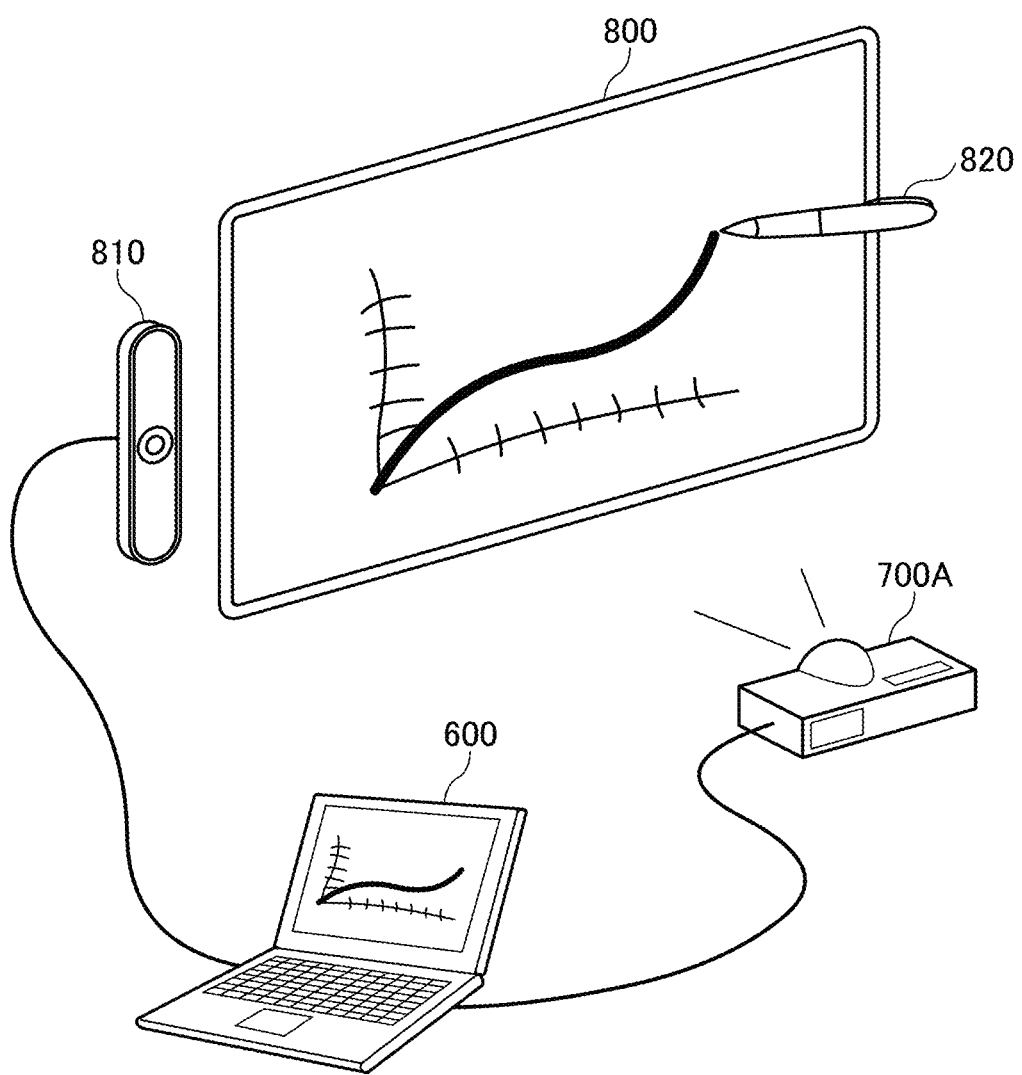
FIG. 22 is a diagram illustrating a configuration of a display system according to a fourth embodiment of the disclosure.

Second Example of Configuration of Display System:

FIG. 22 is a diagram illustrating an example of the configuration of the display system according to a fourth embodiment. In the example illustrated FIG. 22, the display system includes a terminal device 600 (e.g., a PC), an image projection device 700A, and a pen motion detection device 810.

The terminal device 600 is coupled to the image projection device 700A and the pen motion detection device 810 by wire. The image projection device 700A projects image data input from the terminal device 600 onto a screen 800.

The pen motion detection device 810 communicates with an electronic pen 820 to detect a motion of the electronic pen 820 in the vicinity of the screen 800. More specifically, the pen motion detection device 810 detects coordinates indicating the position pointed by the electronic pen 820 on the screen 800 and transmits the coordinates to the terminal device 600. The detection method may be similar to that of FIG. 21. A function corresponding to the contact position detection unit 21 (illustrated in FIG. 4) of the display apparatus 2, is implemented by the electronic pen 820 and the pen motion detection device 810. Other functions corresponding to the functional units other than the contact position detection unit 21 of the display apparatus 2 are implemented by the terminal device 600. In other words, the terminal device 600 is a general-purpose computer, and installed with software that causes the terminal device 600 to function as the functional units, except for the contact position detection unit 21, of the display apparatus 2 as illustrated in FIG. 4. In addition, a function corresponding to the display control unit 26 is implemented by the terminal device 600 and the image projection device 700A.

Based on the coordinate information received from the pen motion detection device 810, the terminal device 600 generates image data (hand drafted data) of user hand drafted input by using the electronic pen 820 and causes the image projection device 700A to project the hand drafted data on the screen 800.

The terminal device 600 generates data of a superimposed image in which an image based on the hand drafted data input by the electronic pen 820 is superimposed on the background image projected by the image projection device 700A.

Fifth Embodiment

Figure 23:
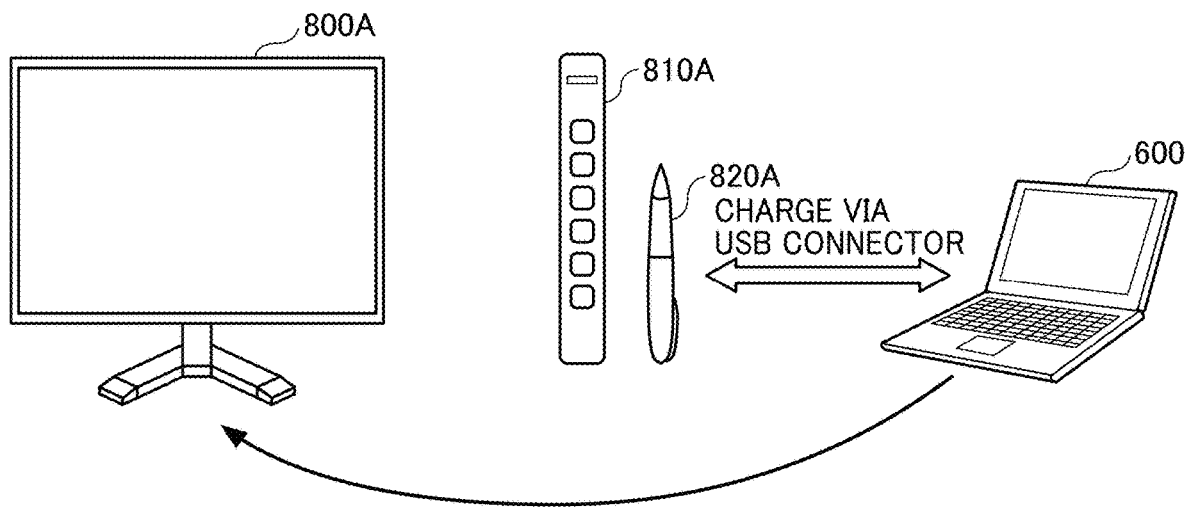
FIG. 23 is a diagram illustrating a configuration of a display system according to a fifth embodiment of the disclosure.

Third Example of Configuration of Display System:

FIG. 23 is a diagram illustrating a configuration of a display system according to a fifth embodiment. In the example of FIG. 23, the display system includes a terminal device 600, a display 800A, and a pen motion detection device 810A.

The pen motion detection device 810A, which is disposed in the vicinity of the display 800A, detects coordinate information indicating a position pointed by an electronic pen 820A on the display 800A and transmits the coordinate information to the terminal device 600. The method of detecting is substantially the same as one described with reference to FIG. 21. In the example of FIG. 23, the electronic pen 820A can be charged from the terminal device 600 via a USB connector. A function corresponding to the contact position detection unit 21 (illustrated in FIG. 4) of the display apparatus 2, is implemented by the electronic pen 820A and the pen motion detection device 810A. Other functions corresponding to the functional units other than the contact position detection unit 21 of the display apparatus 2 are implemented by the terminal device 600. In other words, the terminal device 600 is a general-purpose computer, and installed with software that causes the terminal device 600 to function as the functional units, except for the contact position detection unit 21, of the display apparatus 2 as illustrated in FIG. 4. In addition, a function corresponding to the display control unit 26 is implemented by the terminal device 600 and the display 800A.

Based on the coordinate information received from the pen motion detection device 810, the terminal device 600 generates image data (hand drafted data) of a user hand drafted input performed with the electronic pen 820A and displays an image based on the image data corresponding to the hand drafted data on the display 800A.

Sixth Embodiment

Figure 24:
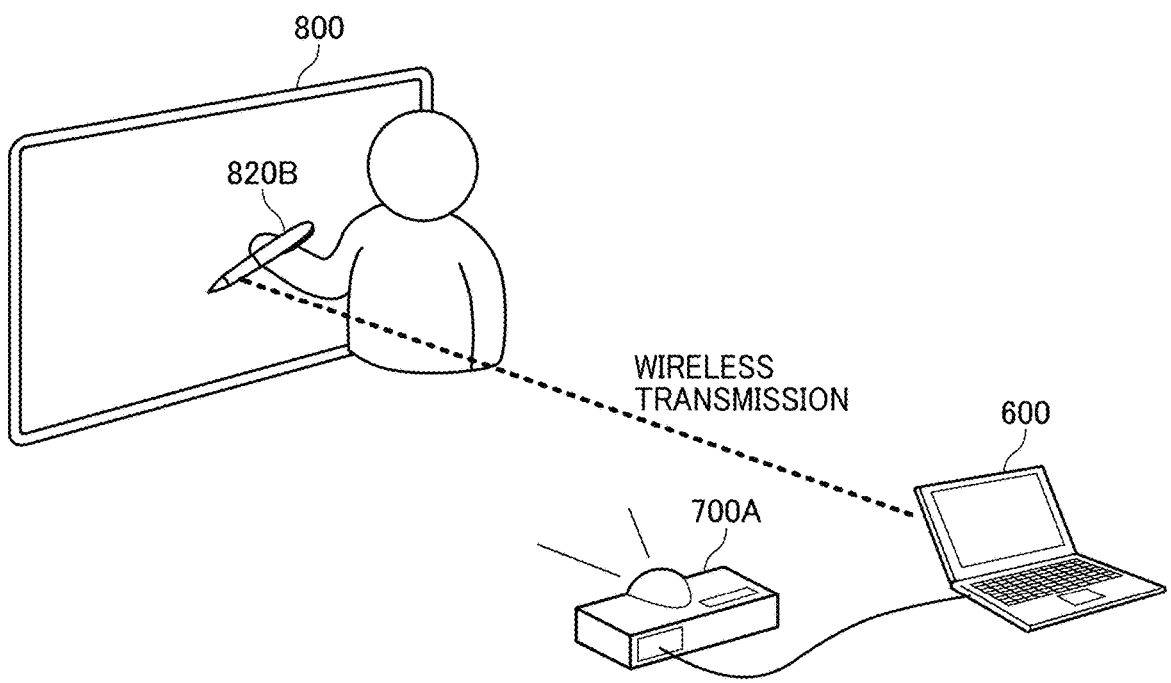
FIG. 24 is a diagram illustrating a configuration of a display system according to a sixth embodiment of the disclosure.

Fourth Example of Configuration of Display System:

FIG. 24 is a diagram illustrating a configuration of a display system according to a sixth embodiment. In the example illustrated FIG. 24, the display system includes a terminal device 600 and an image projection device 700A.

The terminal device 600 communicates with an electronic pen 820B through by wireless communication such as BLUETOOTH, to receive coordinate information indicating a position pointed by the electronic pen 820B on a screen 800. The electronic pen 820B may read minute position information on the screen 800, or receive the coordinate information from the screen 800.

Based on the received coordinate information, the terminal device 600 generates image data (hand drafted data) of user hand drafted input by the electronic pen 820B, and causes the image projection device 700A to project an image based on the hand drafted data.

The terminal device 600 generates data of a superimposed image in which an image based on the hand drafted data input by the electronic pen 820B is superimposed on the background image projected by the image projection device 700A. A function corresponding to the contact position detection unit 21 (illustrated in FIG. 4) of the display apparatus 2, is implemented by the electronic pen 820B and the terminal device 600. Other functions corresponding to the functional units other than the contact position detection unit 21 of the display apparatus 2 are implemented by the terminal device 600. In other words, the terminal device 600 is a general-purpose computer, and installed with software that causes the terminal device 600 to function as the functional units of the display apparatus 2 as illustrated in FIG. 4. In addition, a function corresponding to the display control unit 26 is implemented by the terminal device 600 and the image projection device 700A.

The embodiments described above are applied to various system configurations.

Variation:

The above-described embodiment is illustrative and does not limit the present disclosure. Thus, numerous additional modifications and variations are possible in light of the above teachings within the scope of the present disclosure. For example, elements and/or features of different illustrative embodiments may be combined with each other and/or substituted for each other within the scope of the present invention. Any one of the above-described operations may be performed in various other ways, for example, in an order different from the one described above.

In the embodiment described above, the drawing comparison unit 25 evaluates the similarity with respect to the vector of the pair of corners of the drawing component using the cosine similarity, for example. However, the similarity may be obtained by pattern matching of image data of the drawing component.

In the above-described embodiment, the description concerns the display apparatus to be used as an electronic whiteboard. However, the display apparatus may be any device, for example, a digital signage, which displays an image. Instead of a displaying display data of a display apparatus, display data of a projector may be used. In this case the display apparatus 2 may detect the coordinates of the tip of the pen using ultrasonic waves, although the coordinates of the tip of the pen are detected using the touch panel in the above-described embodiment. The pen emits an ultrasonic wave in addition to the light, and the display apparatus 2 calculates a distance based on an arrival time of the sound wave. The display apparatus 2 determines the position of the pen based on the direction and the distance. The projector draws (projects) the trajectory of the pen as a stroke.

In alternative to the electronic whiteboard described above, the present disclosure is applicable to any information processing apparatus with a touch panel. An apparatus having capabilities similar to that of an electronic whiteboard is also called an electronic information board or an interactive board. Examples of the information processing apparatus with a touch panel include, but not limited to, a projector (PJ), a data output device such as a digital signage, a head up display (HUD), an industrial machine, an imaging device such as a digital camera, a sound collecting device, a medical device, a network home appliance, a laptop computer, a mobile phone, a smartphone, a tablet terminal, a game console, a personal digital assistant (PDA), a wearable PC, and a desktop PC.

In the block diagram such as FIG. 4, functional units are divided into blocks in accordance with main functions of the display apparatus 2, in order to facilitate understanding the operation by the display apparatus 2. Each processing unit or each specific name of the processing unit is not to limit a scope of the present disclosure. A process implemented by the display apparatus 2 may be divided into a larger number of processes depending on the content of process. Also, one processing unit may be divided so as to include more steps of processing.

Although characteristic functions of the above-described embodiment are provided by the display apparatus 2 alone in the description above, a server may provide at least a portion of the functions of the display apparatus 2. In this case, the display apparatus 2 and the server communicate with each other via a network. The display apparatus 2 displays the handwritten data and transmits the handwriting data to the server, and the server provides a character recognition function and a table function.

Further, in the embodiments described above, even if a threshold value is exemplified as a value to be compared, the threshold value is not limited to the exemplified value. For this reason, in the present embodiment, regarding all of the threshold values, expressions "less than the threshold value" and "equal to or less than the threshold value" may have an equivalent meaning, and expressions "greater than the threshold value" and "equal to or more than the threshold value" may have an equivalent meaning. For example, the expression "less than the threshold value" when the threshold value is 11" may have substantially the same meaning as "less than or equal to the threshold value when the threshold value is 10." For example, the expression "less than the threshold value" when the threshold value is 10" may have substantially the same meaning as "less than or equal to the threshold value when the threshold value is 11."

Each of the functions of the above-described embodiments may be implemented by one or more processing circuits. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The contact position detection unit 21 is an example of a receiving unit. The login management unit 29 is an example of an authentication unit. The drawing component management unit 24 is an example of a storage unit. The display control unit 26 is an example of a display control unit. The drawing comparison unit 25 is an example of a similarity degree calculating unit.

With a related art, drawing parts are not stored. In other words, drawing data, which represents a whole drawing, input by a user hand drafted input is not divided into one or more drawing parts to be stored. Due to this, prospective drawings to be displayed are not well found unless a large number of hand drafted inputs for the drawing are received in the case of the drawing of which the drawing data is a large.

A display apparatus according to an embodiment of the disclosure displays a drawing represented by drawing data and including one or more drawing components, on the basis of one of the one or more drawing components stored.

The invention claimed is:
1. A display apparatus, comprising
circuitry configured to:
receive an input of a plurality of strokes representing a drawing that includes one or more drawing components including a first drawing component, the plu- rality of strokes being divided under a predetermined condition to obtain the one or more drawing components;

perform user authentication;

store, in a memory, each of the one or more drawing components including the first drawing component and drawing data representing the drawing in association with information on an authenticated user; and display, on a display screen in response to receiving an input of a second drawing component according to a user operation of the authenticated user, the drawing represented by the drawing data based on the first drawing component and the second drawing component.

2. The display apparatus of claim 1, wherein the circuitry is further configured to obtain a value of a similarity degree between the first drawing component and the second drawing component, and display, based on a determination indicating that the value of the similarity degree is equal to or greater than a threshold value, the drawing represented by the drawing data.

3. The display apparatus of claim 1, wherein the circuitry is further configured to display, based on the first drawing component and the second drawing component, a list of one or more drawings including the drawing represented by the drawing data, and display, in response to a selection of one of the one or more drawings, the one of the one or more drawings.

4. The display apparatus of claim 1, wherein the predetermined condition is one of a first condition and a second condition, the first condition being one in which an input of a subsequent stroke is received at a position separated, by a distance equal to or greater than a predetermined distance, from a stroke received last, the second condition being another one in which no input of the subsequent stroke is received within a certain period of time after the stroke is received last, and the circuitry is further configured to determine one or more of the plurality of strokes as each of the one or more drawing components, the one or more of the plurality of strokes being input from a first time at which the predetermined condition is satisfied to a second time at which the predetermined condition is satisfied after the first time.

5. The display apparatus of claim 2, wherein when a distance between two strokes included in the first drawing component is equal to or less than a predetermined distance, and an angle formed by the two strokes is equal to or greater than a predetermined angle, the circuitry is further configured to detect a midpoint of a line having a minimum distance between the two strokes as a first corner included in the first drawing component, store, in the memory, coordinates of the first corner in association with the drawing data, and obtain the value of the similarity degree between the first drawing component and the second drawing component based on the coordinates of the first corner and coordinates of a second corner, the second corner being included in the second drawing component.

6. The display apparatus of claim 2, wherein when an angle formed by a stroke of which a direction changes at a point and included in the first drawing component is equal to or greater than another predetermined angle, the circuitry is further configured to detect the point as a first corner included in the first drawing component, store, in the memory, coordinates of the first corner in association with the drawing data, and obtain the value of the similarity degree between the first drawing component and the second drawing component based on the coordinates of the first corner and coordinates of a second corner, the second corner being included in the second drawing component.

7. The display apparatus of claim 5, wherein the circuitry is further configured to obtain a value of a cosine similarity degree between the first drawing component and the second drawing component based on first additional coordinates of a corner adjacent to the first corner and second additional coordinates of another corner adjacent to the second corner, and compare the value of the cosine similarity degree with a threshold value to determine whether the first drawing component has similarity to the second drawing component.

8. The display apparatus of claim 6, wherein the circuitry is further configured to obtain a value of a cosine similarity degree between the first drawing component and the second drawing component based on first additional coordinates of a corner adjacent to the first corner and second additional coordinates of another corner adjacent to the second corner, and compare the value of the cosine similarity degree with a threshold value to determine whether the first drawing component has similarity to the second drawing component.

9. A display method, comprising:

receiving an input of a plurality of strokes representing a drawing that includes one or more drawing components including a first drawing component, the plurality of strokes being divided under a predetermined condition to obtain the one or more drawing components;

performing user authentication;

storing, in a memory, each of the one or more drawing components including the first drawing component and drawing data representing the drawing in association with information on an authenticated user; and displaying, on a display screen in response to receiving an input of a second drawing component according to a user operation of the authenticated user, the drawing represented by the drawing data based on the first drawing component and the second drawing component.

10. A non-transitory recording medium storing a plurality of instructions which, when executed by one or more processors, cause the one or more processors to perform a method comprising:

receiving an input of a plurality of strokes representing a drawing that includes one or more drawing components including a first drawing component, the plurality of strokes being divided under a predetermined condition to obtain the one or more drawing components;

performing user authentication;

storing, in a memory, each of the one or more drawing components including the first drawing component and drawing data representing the drawing in association with information on an authenticated user; and displaying, on a display screen in response to receiving an input of a second drawing component according to a user operation of the authenticated user, the drawing represented by the drawing data based on the first drawing component and the second drawing component.

* * * * *